US012700166B2

(12) United States Patent (10) Patent No.: US 12,700,166 B2
Bruce et al. (45) Date of Patent: Aug. 4, 2026

(54) GRAPHICS PROCESSING USING BOUNDING VOLUMES FOR RAY TRACING

(71) Applicant: Arm Limited, Cambridge (GB)

(72) Inventors: Richard Edward Bruce, Great Shelford (GB); Alexander James Westby, Cambridge (GB)

(73) Assignee: Arm Limited, Cambridge (GB)

( * ) Notice: Subject to any disclaimer, the term of this patent is extended or adjusted under 35 U.S.C. 154(b) by 114 days.

(21) Appl. No.: 18/644,347

(22) Filed: Apr. 24, 2024

(65) Prior Publication Data

US 2025/0336140 A1     Oct. 30, 2025

(51) Int. Cl.
*G06T 15/06* (2011.01)
(52) U.S. Cl.
CPC .................................... *G06T 15/06* (2013.01)
(58) Field of Classification Search
CPC ................................ G06T 15/06; G06T 17/00
See application file for complete search history.

(56) References Cited

U.S. PATENT DOCUMENTS

2025/0200890 A1* 6/2025 Kensler ................... G06T 17/10

OTHER PUBLICATIONS

"GitHub_NVIDIAGameWorks_Displacement Micro-Map Toolkit" pp. 1-10, retrieved Aug. 16, 2024.

* cited by examiner

*Primary Examiner* — Daniel F Hajnik
*Assistant Examiner* — Thomas John Foster
(74) *Attorney, Agent, or Firm* — Pearl Cohen LLP

(57) ABSTRACT
When performing ray tracing in a graphics processing system a ray tracing acceleration data structure comprising nodes having associated bounding volumes is provided for use when determining a sub-triangle of a displacement micromapped triangular primitive that may be intersected by a ray. The bounding volumes of the nodes of the ray tracing acceleration data structure comprise volumes having triangular ends and are formed by the triangular ends and planes joining corresponding sides of the triangular ends of the volume. When a ray intersects the triangular primitive having the associated displacement micromap, the ray tracing acceleration data structure for the primitive is traversed for the ray.

18 Claims, 16 Drawing Sheets

GRAPHICS PROCESSING USING BOUNDING VOLUMES FOR RAY TRACING

BACKGROUND

The technology described herein relates to graphics processing systems, and in particular to the rendering of frames (images) for display using ray tracing.

FIG. 1 shows an exemplary system on-chip (SoC) graphics processing system 8 that comprises a host processor in the form of a central processing unit (CPU) 1, a graphics processor (GPU) 2, a display processor 3 and a memory controller 5.

As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 13 such as a game, executing on the host processor (CPU) 1 will, for example, require the display of frames on the display panel 7. To do this, the application will submit appropriate commands and data to a driver 11 for the graphics processor 2 that is executing on the CPU 1. The driver 11 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

One rendering process that may be performed by a graphics processor is so-called "ray tracing". Ray tracing is a rendering process which involves tracing the paths of rays of light from a viewpoint (sometimes referred to as a "camera") back through sampling positions in an image plane into a scene, and simulating the effect of the interaction between the rays and objects in the scene. The output data value for a sampling position in the image (plane) is determined based on the object(s) in the scene intersected by the ray passing through the sampling position, and the properties of the surfaces of those objects. The ray tracing calculation is complex, and involves determining, for each sampling position, a set of zero or more objects within the scene which a ray passing through the sampling position intersects.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The point 24 at which the ray 20 first intersects an object in the scene is identified. This first intersection will be with the object in the scene closest to the sampling position. In this example, the first intersected object is represented by a set (e.g. mesh) of triangle primitives, and the ray 20 is found to intersect a triangle primitive 25 representing the object. A secondary ray in the form of shadow ray 26 may be cast from the first intersection point 24 to a light source 27. Depending upon the material of the surface of the object, another secondary ray in the form of reflected ray 28 may be traced from the intersection point 24. If the object is, at least to some degree, transparent, then a refracted secondary ray may be considered.

Ray tracing is considered to provide better, e.g. more realistic, physically accurate images than more traditional rasterisation rendering techniques, particularly in terms of the ability to capture reflection, refraction, shadows and lighting effects. However, ray tracing can be significantly more processing-intensive than traditional rasterisation, and so it is usually desirable to be able to accelerate ray tracing.

One way of accelerating ray tracing is the use of so-called "micromaps". In such techniques, a primitive is sub-divided into a "micromesh" comprising correspondingly shaped "sub-primitives", with a micromap associated with the primitive then storing information (data), such as respective property (e.g. opacity) values relating to the sub-primitives. The use of micromaps can allow fine detail to be more efficiently encoded and processed.

The Applicant believes that there remains scope for improved techniques for performing ray tracing using a graphics processor.

BRIEF DESCRIPTION OF THE DRAWINGS

Embodiments of the technology described herein will now be described by way of example only and with reference to the accompanying drawings, in which.

Like reference numerals are used for like components where appropriate in the drawings.

DETAILED DESCRIPTION

Figure 1:
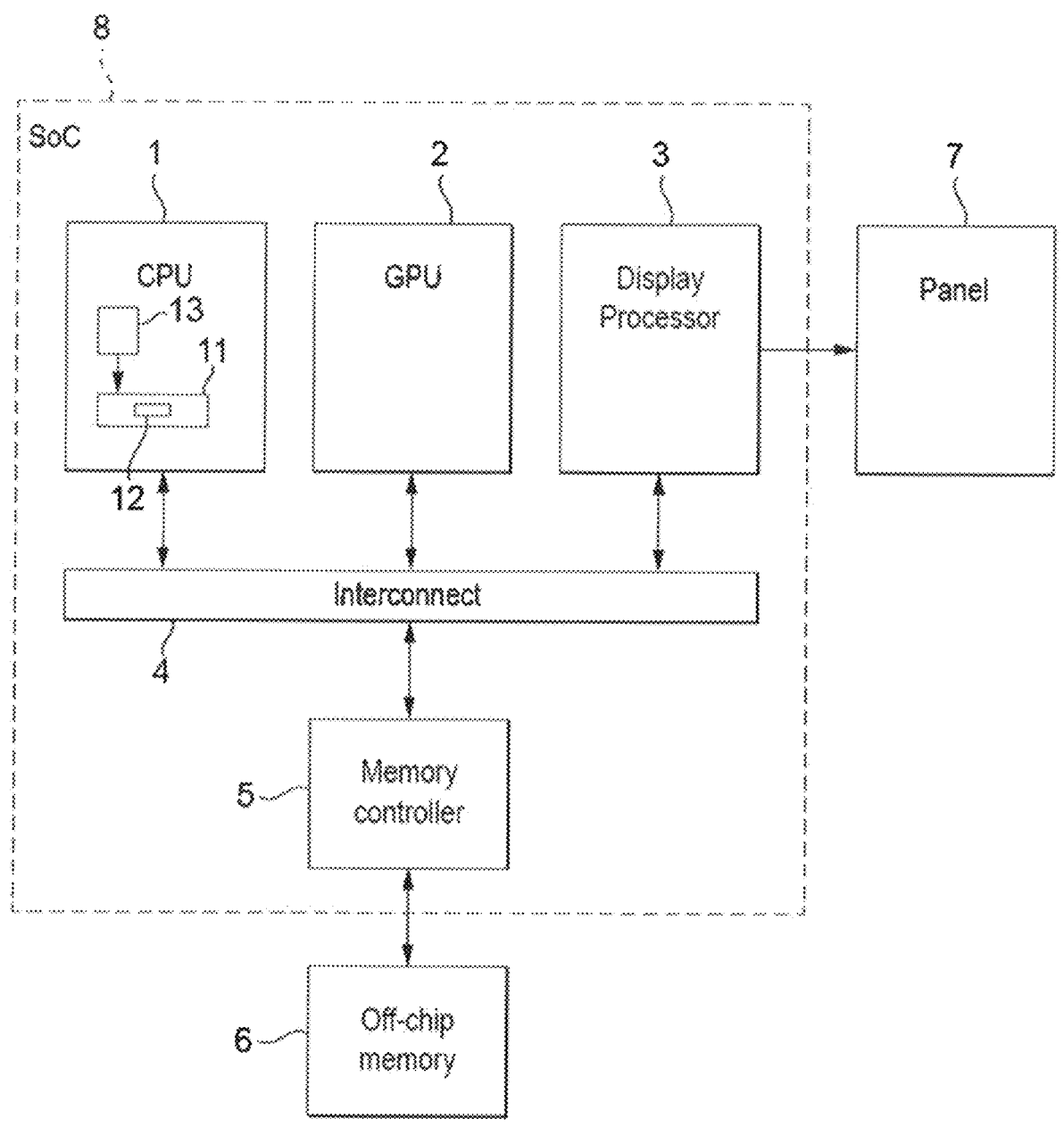
FIG. 1 shows an exemplary graphics processing system.

A first embodiment of the technology described herein comprises a method of operating a graphics processing system that is operable to generate a render output by performing a ray tracing process in which rays are traced for a scene to be rendered;

the method comprising:

for a triangular primitive for a scene being rendered that has an associated displacement micromap that stores displacement information for respective vertices of a plurality of sub-triangles that the triangular primitive is to be divided into, providing a ray tracing acceleration data structure comprising nodes having associated bounding volumes for use when determining a sub-triangle of the triangular primitive that may be intersected by a ray, wherein the bounding volumes of the nodes of the ray tracing acceleration data structure comprise volumes having triangular ends and formed by the triangular ends and planes joining corresponding sides of the triangular ends of the volume;

the method further comprising:

when a ray intersects the triangular primitive having the associated displacement micromap:

traversing the ray tracing acceleration data structure for the primitive for the ray; and performing further processing based on the traversing the ray tracing acceleration data structure for the primitive for the ray.

A second embodiment of the technology described herein comprises a graphics processing system that is operable to generate a render output by performing a ray tracing process in which rays are traced for a scene to be rendered;

the graphics processing system comprising:

a ray-tracing acceleration data structure providing circuit configured to provide for a triangular primitive for a scene being rendered that has an associated displacement micromap that stores displacement information for respective vertices of a plurality of sub-triangles that the triangular primitive is to be divided into, a ray tracing acceleration data structure comprising nodes having associated bounding volumes for use when determining a sub-triangle of the triangular primitive that may be intersected by a ray, wherein the bounding volumes of the nodes of the ray tracing acceleration data structure comprise volumes having triangular ends and formed by the triangular ends and planes joining corresponding sides of the triangular ends of the volume; and a ray tracing acceleration data structure traversal circuit configured to, when a ray intersects a triangular primitive having an associated displacement micromap:

traverse a ray tracing acceleration data structure for the primitive for a ray; and perform further processing based on the traversing the ray tracing acceleration data structure for the primitive for the ray.

The technology described herein relates to performing ray tracing in graphics processing systems in which (triangular) primitives can be sub-divided into a plurality of "displaced" triangular sub-regions (sub-triangles/micro-triangles), by a "displacement micromapping" process. As will be discussed in more detail below, a displacement micromap stores indications of how vertices for sub-triangles that a triangular primitive is to be sub-divided into should be displaced (relative to undisplaced positions of the vertices). This allows more detailed geometry to be created "on-the-fly", without the need to store in advance all the vertices, etc., for that more detailed geometry (micro-triangles). This can then facilitate effectively having a greater number of triangles, but with much lower memory cost, for example.

The Applicants have recognised that when using such displacement micromaps, there will be a need to determine which sub-triangle defined by a displacement micromap a given ray actually intersects. To facilitate this, in the technology described herein, an acceleration data structure is used (at least in part) to determine which sub-triangle a ray intersects. This can then avoid the need to test a ray against all the sub-triangles defined for a given primitive using a displacement micromap, for example.

Furthermore, in the technology described herein the acceleration data structure for the displacement micromapped triangle uses bounding volumes having triangular ends (bases). The Applicants have recognised that using bounding volumes having triangular ends for representing a displacement micromapped triangle can reduce or avoid overlaps between different bounding volumes of the ray-tracing acceleration data structure, as compared, for example, to if using bounding volumes in the form of axis-aligned bounding boxes (AABBs). Thus by using bounding volumes having triangular ends, as in the technology described herein, the sub-triangle (micro-triangle) intersected by a ray can be more efficiently determined. For example, the acceleration data structures used in the technology described herein may be able to be traversed (much) faster than an acceleration data structure that uses a hierarchy of axis-aligned bounding boxes (AABBs), for example.

Furthermore, and as will be discussed further below, the Applicants have recognised that it can be relatively straightforward to determine bounding volumes having triangular ends for a displacement micromapped triangle, and so the generation of the acceleration data structure in the first place may be performed relatively efficiently as well.

The graphics processing system should, and in embodiments does, comprise a graphics processor (GPU). The graphics processing system may further comprise a host processor, e.g. a central processing unit (CPU). The host processor (e.g. CPU) may execute applications that can require graphics processing by the graphics processor (GPU), and send appropriate commands and data to the graphics processor (GPU) to control it to perform graphics processing operations and to produce graphics processing (render) output required by applications executing on the host processor (CPU).

To facilitate this, the host processor (CPU) in embodiments also executes a driver for the graphics processor (GPU). Thus, in embodiments, the graphics processing system comprises a graphics processor (GPU) that is in communication with a host microprocessor (CPU) that executes a driver for the graphics processor (GPU).

A (each) operation of the technology described herein may be performed by the graphics processor (GPU), and/or host processor (CPU), and/or another component of the graphics processing system, as appropriate. Correspondingly, a (each) circuit of the technology described herein may form part of the graphics processor (GPU), and/or host processor (CPU), and/or another component of the graphics processing system, as appropriate.

The technology described herein relates in particular to the situation where a (triangular) primitive has an associated displacement micromap. In such arrangements, the micromap will define a respective displacement value for each (micro) vertex of a plurality of sub-triangles (micro-triangles) that the "base" triangular primitive (triangle) that the displacement micromap is associated with is to be sub-divided into. Thus the displacement micromap should, and in an embodiment does, define displacement values for each vertex of each sub-triangle of plural sub-triangles that the triangle primitive is to be divided into.

The number of sub-triangles that a base triangular primitive associated with a displacement micromap is to be divided into can be any suitable and desired number of sub-triangles (micro-triangles). A triangular primitive is in an embodiment sub-divided into a power of 2 number of sub-triangles. In embodiments, sub-triangles are defined by a "four-way" recursive sub-division of a triangular primitive into sub-triangles. Thus, in embodiments, a triangle primitive is sub-divided into 22n sub-triangles, where n is a positive integer. For example, and in embodiments, a triangle primitive is sub-divided into (up to) 4, 16, 64, 256, or 1024 sub-triangles.

In an embodiment, the displacement micromap defines the number of sub-triangles that the primitive is to be divided into at the lowest level of sub-division (e.g. whether it is to be sub-divided into a maximum of 16, 64, 256 or 1024 sub-triangles at its lowest level of sub-division).

The displacement micromap should, and in an embodiment does, indicate a respective displacement value for each vertex of a, and in an embodiment for plural, and in an embodiment for each, each sub-triangle that the base triangular primitive is to be sub-divided into. A displacement micromap may include displacement values for all the sub-triangle vertices at each and every sub-division level down to the lowest level for the micromap, or it may only define displacement values for some but not all of the levels, with displacement values for other levels then, e.g. being derived from those displacement values, for example, and in an embodiment, by appropriate interpolation. For example, the displacement micromap could indicate displacement values for each vertex for each sub-triangle at the lowest level of sub-division of the triangular primitive only.

In an embodiment, the displacement micromap indicates displacement values for each vertex for each sub-triangle at the lowest level of sub-division of the triangular primitive and for some or all of the sub-triangles at any intervening levels of the sub-division between the base triangle and the lowest sub-division (the maximum sub-division sub-triangles). Thus, for example, in the case where a triangular primitive is to be sub-divided into 64 sub-triangles at the lowest sub-division level, the corresponding displacement micromap in an embodiment indicates displacement values for each vertex of each sub-triangle at levels where the base triangle is divided into 4, 16 and then 64 sub-triangles.

The displacement value that is indicated for a (and each) vertex of a (and each) sub-triangle that the displacement micromap relates to can take any suitable and desired form. In an embodiment, the displacement values comprise scalar displacement values, in an embodiment values that can be used as an appropriate scaling factor for a displacement vector for the vertex in question. Thus the sub-triangle vertex displacement values that the displacement micromap indicates in an embodiment comprise fractional values between 0 and 1, that can then be applied as an appropriate scaling factor for the vertex in question.

In an embodiment, the displacement micromap for a triangle also indicates a respective position for each vertex of the base triangle (i.e. the triangle to which the displacement micromap applies).

In an embodiment, the micromap also indicates respective displacement directions (vectors) for each vertex of the base triangle (i.e. the triangle to which the displacement micromap applies).

(The actual displacement for a given vertex of a sub-triangle is in an embodiment then determined by appropriate, in an embodiment linear, interpolation of the displacement vectors for the vertices for the base triangle (based on the position of the vertex for the sub-triangle in question within the base triangle), and the indicated (scalar) displacement value for the sub-triangle vertex in question.)

A given displacement micromap may be associated with only one (a single) (base) triangular primitive, or a displacement micromap may be used and associated with plural different triangular (base) primitives, as desired. Equally, there may be primitives that do not have any displacement micromap associated with them.

The micromap itself may be generated and provided in any suitable and desired manner. In embodiments, a displacement micromap is provided (e.g. defined) by an application, e.g. executing on the host processor (CPU). In embodiments, a micromap (defined by an application) is provided to the graphics processor (GPU), e.g. by the driver executing on the host processor (CPU).

In the technology described herein, when a triangular primitive having an associated displacement micromap is intersected by a ray, then a ray tracing acceleration data structure is traversed for determining a sub-triangle of the primitive that may be intersected by the ray. The ray tracing acceleration data structure should be, and is in an embodiment, representative of the sub-division of the (base) triangle primitive into sub-triangles by the displacement micromap.

The ray tracing acceleration data structure for a triangular primitive that has an associated displacement micromap can take any suitable and desired form (subject to it comprising nodes having associated bounding volumes having triangular bases ends and formed by the triangular ends and planes joining corresponding sides of the triangular ends of the volume).

In an embodiment, the ray tracing acceleration data structure comprises a plurality of nodes, with each node of the ray tracing acceleration data structure having a respective, associated bounding volume having triangular ends and formed by the triangular ends and planes joining corresponding sides of the triangular ends of the volume that is representative of (and in an embodiment encompasses) the volume occupied by one or more of the sub-triangles that the base triangular primitive is to be divided into (by the subset of sub-triangles that the node corresponds to (represents)) (such that determining that a ray intersects the volume associated with a node of the ray tracing acceleration data structure correspondingly indicates that the ray may intersect with one of the sub-triangles that the node corresponds to).

In an embodiment, the ray tracing acceleration data structure is arranged as a hierarchy of nodes representing a hierarchy of volumes, e.g., and in embodiments, the ray tracing acceleration data structure comprises a bounding volume hierarchy (BVH).

In an embodiment, the ray-tracing acceleration data structure for a triangle having a displacement mipmap comprises plural nodes arranged in a hierarchy, and including at least a "highest-level" root node that represents the whole of the triangle that the micromap applies to (i.e. all of the sub-triangles that the micromap defines displacement values for). Other nodes of the structure are, in embodiments, "lower-level" nodes that each represent a respective sub-set of some but not all of the sub-triangles that the micromap defines displacement values for. In embodiments, a (each) node of the ray-tracing acceleration data structure accordingly represents a particular set of sub-triangles of the base primitive: e.g. the root node representing the entire (base) primitive, and a (each) lower-level node representing a respective (contiguous) set of some but not all of the sub-triangles.

A (each) node of the ray-tracing acceleration data structure should be, and in embodiments is, either an internal ("parent") node or an end ("leaf") node. In embodiments, a (each) internal (parent) node has an associated set of lower-level "child" nodes (whereas a (each) end node does not have any child nodes). In embodiments, a (each) child node of an internal (parent) node represents a respective non-overlapping and equal-sized sub-set of the set of sub-triangles that the internal (parent) node represents. In embodiments, a (each) end node is associated with a respective set of one or more sub-triangles of the displacement micromapped triangle.

In embodiments, the number of child nodes that an internal (parent) node has corresponds to the micromap sub-division that defines the primitive sub-triangles. Thus, in embodiments, where the sub-triangles are defined by a recursive four-way sub-division of a primitive, the ray-tracing acceleration data structure representation is correspondingly a four-way "tree", i.e. a quadtree. Thus, in embodiments, a (each) internal (parent) node has (exactly) four child nodes.

Thus, a (and each) parent node in an embodiment has a plurality of child nodes, and in an embodiment one child node for each sub-triangle that the (sub-) triangle that the parent node represents will be divided into at the next level of sub-division (so four child nodes where primitive sub-triangles are defined by a recursive four-way sub-division of a triangular primitive). Each such child node correspondingly in an embodiment has an associated bounding volume that represents (and in an embodiment encompasses) the sub-triangle at the level of sub-division in question that the node relates to.

For example, and in embodiments, a ("full") ray-tracing acceleration data structure representation of a displacement micromapped triangle comprises a root node that represents all of the primitive sub-triangles which the micromap defines displacement values for. The root node then has a set of (e.g., in the case of a quadtree, four) child nodes that each represent a respective sub-set (e.g. quarter) of the primitive sub-triangles (corresponding to a respective non-overlapping and equal-sized region (e.g. quarter) of the primitive area). Each child node of the root node may then have a set of (e.g. four) child nodes that each represent a respective sub-set (e.g. quarter) of the primitive sub-triangles that the child node of the root node represents (corresponding to a respective non-overlapping and equal-sized region (e.g. quarter) of the region (e.g. quarter) of the primitive area that the child node of the root node represents), and so on, down to the end nodes that each represent a respective (and different) sub-set of one or more individual sub-triangles (at the lowest sub-division level).

Thus the ray tracing acceleration data structure for a triangular primitive having an associated displacement micromap in an embodiment comprises at least a "highest-level" root node that represents the whole of the displacement micromapped primitive (i.e. all of the sub-triangles that the displacement micromap defines displacement values for) (and that has associated with it a volume that all of the primitive sub-regions that the micromap defines displacement values for will fall within). Other nodes of the hierarchy are in an embodiment then "lower-level" nodes that each represent and have an associated bounding volume for a respective sub-set of some but not all of the sub-triangles (at the lowest sub-division level) that the displacement micromap defines displacement values for.

The ray tracing acceleration data structure in an embodiment ends with end (leaf) nodes that are each associated with (represent) a set of one or more sub-triangles that the triangle is to be divided into at the lowest level of sub-division.

While it would be possible for an acceleration data structure to represent a displacement micro-mapped triangle all the way down to the end (lowest) micromap sub-division level (i.e. such that each end node represents an individual sub-triangle at the lowest level of sub-division), in an embodiment the ray tracing acceleration data structure does not (explicitly) represent one or more of the lowest levels of the micromap sub-division.

Thus, in an embodiment, a (each) end (leaf) node of the ray tracing acceleration data structure for a displacement micromapped triangle represents a plurality of sub-triangles of the displacement micromapped triangle (of the lowest micromap sub-division level).

In an embodiment, the ray tracing acceleration data structure represents the displacement micromap sub-division of the triangular primitive down to the penultimate micromap level (i.e. such that a (each) leaf (end) node of the ray tracing acceleration data structure will, for example, and in an embodiment, represent 4 sub-triangles of the lowest micromap level).

This may be appropriate in particular where the ray-primitive intersection testing of the graphics processing system (of the graphics processor) supports testing plural triangles in parallel, as it may then be more efficient for a final level of displacement micromap testing to be performed as respective ray-triangle tests, rather than performing further ray-bounding volume tests to identify respective individual sub-triangles to be tested.

The ray tracing acceleration data structure for a displacement micromapped triangle could be generated in advance of any rendering of a scene that includes the triangle in question. For example, it could be generated by (e.g. an application or the driver executing on) the host processor (CPU) or another data processor of a data processing system and the generated ray tracing acceleration data structure then provided to the graphics processor as appropriate. Alternatively, the ray tracing acceleration data structure could be generated by the graphics processor itself, for example in advance of any actual rendering of a scene to be rendered in a pre-processing pass or similar.

In this case therefore, the providing of the ray tracing acceleration data structure for a triangular primitive having an associated displacement micromap may comprise loading some or all of a ray tracing acceleration data structure for use that has been generated in advance of rendering the scene in question as required.

In this case, the ray tracing acceleration data structure is in an embodiment provided (e.g. loaded) for use in response to determining that a triangular primitive having an associated displacement micromap has been intersected by a ray.

In an embodiment, the ray tracing acceleration data structure for a displacement micromapped triangle is generated "on-the-fly", as and when it is determined that such a ray tracing acceleration data structure will be required when rendering a scene. Thus, in an embodiment, the ray tracing acceleration data structure for a displacement micromapped triangle is generated when (and in response to) determining that a ray for a scene being rendered intersects the triangular primitive in question (a triangular primitive that has a displacement micromap associated with it).

Thus, in an embodiment of the technology described herein, the method of the technology described herein comprises (and the graphics processing system is correspondingly configured to (and comprises a processing circuit or circuits configured to)) in response to determining that a ray for a scene being rendered intersects a triangular primitive that has a displacement micromap associated with it, generating at least part of a ray tracing acceleration data structure comprising nodes having associated bounding volumes for use when determining a sub-triangle of the triangular primitive that may be intersected by the ray, wherein the bounding volumes for the nodes of the ray tracing acceleration data structure comprise volumes having triangular ends.

Correspondingly, in this case, the providing of the ray tracing acceleration data structure for the triangular primitive that has an associated displacement micromap will comprise providing at least part of a ray tracing acceleration data structure comprising nodes having associated bounding volumes for use when determining a sub-triangle of the triangular primitive that may be intersected by the ray.

It would be possible in these arrangements, where the ray tracing acceleration data structure for a displacement micromapped triangle is generated as and when it is determined that such a ray tracing acceleration data structure will be required when rendering a scene to simply generate the entire ray tracing acceleration data structure (i.e. representing the entirety of the displacement micromapped triangle) once it has been determined that a ray intersects the triangle in question. In this case, the complete ray tracing acceleration data structure will be generated and provided when it is determined that the triangle is intersected by a ray.

In an embodiment only part of the ray tracing acceleration data structure for a displacement micromapped triangle is generated initially when it is determined that a ray intersects a triangle having an associated displacement micromap. In an embodiment that generated part of the ray tracing acceleration data structure is then traversed, with further parts of the ray tracing acceleration data structure then being generated as required based on the progress of the traversal of the ray tracing acceleration data structure parts that have been generated.

For example, only a single or some but not all of the multiple sub-division levels for the displacement micromapped triangle could be, and are in an embodiment, generated, with any further parts of the ray tracing acceleration data structure for the displacement micromapped triangle then being generated in response to it being determined that the ray intersects a node of the ray tracing acceleration data structure before generating the child nodes for that branch of the structure.

For example, it could be determined when traversing the part of the ray tracing acceleration data structure that has been generated that the ray intersects an internal (parent) node of the ray tracing acceleration data structure for which the child nodes have yet to be generated, with that then triggering the appropriate generation of the child nodes (and so on).

Thus, in an embodiment of the technology described herein, the method of the technology described herein comprises (and the graphics processor is correspondingly configured to) in response to determining that a ray intersects a triangular primitive having an associated displacement micromap, generating only part of a ray tracing acceleration data structure that represents the displacement micromapped triangle, and when it is determined (in response to determining) that a ray intersects a node of the generated ray tracing acceleration data structure for which there are no child nodes already generated, generating (at least) those child nodes for that branch of the tree.

Thus, in an embodiment, in response to determining that a ray intersects a triangle having an associated displacement micromap, in an embodiment a first part of a ray tracing acceleration data structure for the displacement micromap triangle is generated, that first part of the ray tracing acceleration data structure is traversed, and then in dependence upon the result of the traversal of that first part of the ray tracing acceleration data structure, a further part of the ray tracing acceleration data structure may be, and is in an embodiment, generated, and correspondingly traversed, with further parts of the ray tracing acceleration data structure being generated and respectively traversed in turn, and as required.

This process is in an embodiment continued until an appropriate end node of the ray tracing acceleration data structure (e.g. indicating a set of one or more sub-triangles of the lowest sub-division level of the micromap) is reached, at which point the traversal of the ray tracing acceleration data structure can be stopped (and, e.g., the appropriate ray-triangle intersection tests (in an embodiment) performed).

Thus, in this case, the providing of a ray tracing acceleration data structure for a triangular primitive having an associated displacement micromap will comprise (generating and) providing a part of a ray tracing acceleration data structure for the displacement micromapped triangular primitive, with that part of the ray tracing acceleration data structure then being traversed for the ray, with the further processing for the ray based on that traversal, in an embodiment, either then being to (generate and) provide a further part of the ray tracing acceleration data structure and traversing that further part of the ray tracing acceleration data structure for the ray, or performing an appropriate ray-triangle intersection test(s) for the ray.

Correspondingly, in these embodiments of the technology described herein (and otherwise), the providing of the ray tracing acceleration data structure may comprise providing only part (at least some but not all) of the "complete" ray tracing acceleration data structure for a displacement micromapped triangle, and then providing further parts of the ray tracing acceleration data structure as and when (and if) required.

Correspondingly, the providing of the ray tracing acceleration data structure may, and in an embodiment does, comprise providing only so much of the "complete" ray tracing acceleration data structure for the displacement micromapped triangle as is required to traverse the ray tracing acceleration data structure for the ray in question (to trace the ray in question for the displacement micromapped triangle).

Correspondingly, in an embodiment, the providing of the ray tracing acceleration data structure for a displacement micromapped triangle for a ray in an embodiment comprises not (other than) providing parts of the "complete" ray tracing acceleration data structure that are not required for tracing the ray in question.

Correspondingly, the providing of a ray tracing acceleration data structure for a displacement micromapped triangle may comprise providing different parts of the complete ray tracing acceleration data structure for the displacement micromapped triangle for different rays that are determined to intersect the triangle (e.g., and in an embodiment, based on the direction of the ray that is being traced).

The part of a ray tracing acceleration data structure that is generated at any one time in these embodiments can be any suitable and desired amount (position) of the (overall) ray tracing acceleration data structure. In an embodiment it comprises generating a ray tracing acceleration data structure representing only some but not all of the sub-division levels of the displacement micromapped triangle. In an embodiment a part of the ray tracing acceleration data structure representing multiple (but not all) sub-division levels of the displacement micromapped triangle is generated at any given time. In an embodiment in this case, two sub-division levels of the displacement micromap are generated at any given time. Other arrangements would, of course, be possible.

In one particularly embodiment, a node and its respective set of (e.g. four) child nodes of the ray tracing acceleration data structure is in an embodiment generated at any one time (for any one generation "event"). In another embodiment, a node and its child nodes and the child nodes of those nodes are generated at any one time.

In the case where a ray tracing acceleration of data structure is generated for a displacement micromapped triangle "on the fly" in this manner, then that processing can be performed by any suitable and desired element or component of the graphics processing system. For example, the graphics processor itself could generate the (part of) the ray tracing acceleration data structure, for example by executing an appropriate (e.g. compute) shader program to do that. Alternatively, the generating of the ray tracing acceleration data structure could be performed by another processor of the system, such as a host processor (e.g. with the requirement to do that appropriately being signalled to that processor), with that processor then storing the generated ray tracing acceleration data structure (part) appropriately for retrieval and use as required.

As discussed above, a (and each) node of a ray tracing acceleration data structure for a displacement micromapped triangle that is used in the technology described herein should, and in an embodiment does, have associated with it a bounding volume having triangular ends (bases) and formed by the triangular ends and planes joining corresponding sides of the triangular ends of the volume.

Thus, the bounding volume will be the volume formed between the triangular ends and the planes joining corresponding sides of those triangular ends of the volume. In other words, the bounding volume can be considered to be the volume "extruded" between the triangular ends of the volume.

The bounding volumes having triangular ends and formed by the triangular ends and planes joining corresponding sides of the triangular ends of the volume for the nodes of the ray tracing acceleration data structure for a displacement micromapped triangle in the technology described herein can be generated in any suitable and desired manner.

In an embodiment, the bounding volume is based on the sub-triangle that the displacement micromapped base triangle is sub-divided into at the micromap sub-division level in question that the node represents. In an embodiment, the bounding volume for a node has respective triangular ends based on the sub-triangle at the micromap sub-division level in question that the node relates to, with the sides of the volume then being appropriate planes that join the (respective) sides of the triangular ends of the volume.

Thus, for example, and in an embodiment, the bounding volume for the root node of the ray tracing acceleration data structure for a displacement micromapped triangle will comprise a volume having triangular ends, which triangular ends are each based on the base triangle that the displacement micromap is associated with.

Correspondingly, for the next level down in the ray tracing acceleration data structure hierarchy, a node of the ray tracing acceleration data structure hierarchy will have a bounding volume in the form of a volume having triangular ends which are based on the respective sub-triangle that the node relates to at the first level of sub-division.

In an embodiment, one triangular end of the volume comprises the sub-triangle in question (at the sub-division level in question) without any displacement of its vertices (i.e. its vertex positions simply within the plane of the base triangle). In an embodiment the other triangular end of the volume is the displaced sub-triangle (i.e. the sub-triangle formed by the displaced positions of the vertices of the sub-triangle).

In other words, in an embodiment, each bounding volume of the ray tracing acceleration data structure for a displacement micromapped triangle comprises a volume where the ends of the volume are the original, undisplaced sub-triangle, and the displaced sub-triangle, in question, respectively.

In the case where the undisplaced sub-triangle and the displaced sub-triangle are parallel, then the bounding volume will accordingly comprise a prismoid having triangular ends (bases). However, as will be appreciated by those skilled in the art, the undisplaced and displaced sub-triangles will typically not be parallel to each other, and so the bounding volume will normally be formed by the volume encompassed by those ends and planes joining the respective sides of the triangular ends.

Such a bounding volume will then encompass the (displaced) sub-triangle (and any lower level sub-triangles within the sub-triangle in question), such that when a ray does not intersect the bounding volume, it can be safely determined that the ray will not intersect the sub-triangle (and any lower level sub-triangles within the sub-triangle in question).

In this case, the undisplaced positions for the vertices of a respective sub-triangle can be determined in any suitable and desired manner. They are in an embodiment determined by appropriate interpolation of the positions of the vertices of the base triangle, e.g., and in an embodiment, based on the position of the sub-triangle within the base triangle in question (e.g., and in an embodiment, in barycentric coordinate space).

Correspondingly, the (positions of) the displaced vertices for a sub-triangle can be determined in any suitable and desired manner, and in an embodiment in accordance with the process for such determination for the displacement micromap operation in the graphics processing system and graphics processor in question.

In an embodiment, this is done by applying an appropriate displacement for the vertex in question to the determined "undisplaced" position for the vertex, in an embodiment based on, and using, the displacement value indicated by the micromap for the vertex in question, and the displacement vectors defined for the vertices of the base triangular primitive that the displacement micromap relates to.

In an embodiment the displaced position of a vertex for a sub-triangle is determined by applying a determined displacement to the (determined) undisplaced position of the vertex.

In an embodiment the displacement that is applied to the un-displaced position for a vertex for a sub-triangle comprises the appropriately interpolated displacement direction vector for the vertex for the sub-triangle in question, scaled by the indicated displacement value for the sub-triangle vertex in question.

The interpolation is in an embodiment based on the position of the vertex for the sub-triangle within the base triangle, in an embodiment in barycentric space.

This determination is in an embodiment done to derive an appropriate bounding volume for each node that is being generated for the ray tracing acceleration data structure. Where appropriate any previous displaced vertex positions, for example, may be reused for (propagated to) a next level of sub-division (for example), and so on.

The ray tracing acceleration data structure for use in the technology described herein for a displacement micro-mapped triangle can otherwise be generated in any suitable and desired manner, e.g., and in an embodiment, based on and using the information in the displacement micromap for the triangle (and by performing appropriate "construction" of the sub-triangles of the displacement micropmap, and their vertices, etc.).

The technology described herein also extends to the generation of the ray-tracing acceleration data structure for a triangular primitive having an associated displacement micromap.

Thus, another embodiment of the technology described herein comprises a method of generating a ray-tracing acceleration data structure for use for a ray-tracing process, the method comprising:

generating for a triangular primitive for a scene to be rendered that has an associated displacement micromap that stores displacement information for respective vertices of a plurality of sub-triangles that the triangular primitive is to be divided into:

a ray tracing acceleration data structure comprising nodes having associated bounding volumes for use when determining a sub-triangle of the triangular primitive that may be intersected by a ray;

wherein the bounding volumes of the nodes of the ray tracing acceleration data structure comprise volumes having triangular ends and formed by the triangular ends and planes joining corresponding sides of the triangular ends of the volume.

Thus, another embodiment of the technology described herein comprises an apparatus for generating a ray-tracing acceleration data structure for use for a ray-tracing process, the apparatus comprising:

a processing circuit configured to generate for a triangular primitive for a scene to be rendered that has an associated displacement micromap that stores displacement information for respective vertices of a plurality of sub-triangles that the triangular primitive is to be divided into:

a ray tracing acceleration data structure comprising nodes having associated bounding volumes for use when determining a sub-triangle of the triangular primitive that may be intersected by a ray;

wherein the bounding volumes of the nodes of the ray tracing acceleration data structure comprise volumes having triangular ends and formed by the triangular ends and planes joining corresponding sides of the triangular ends of the volume.

As will be appreciated by those skilled in the art, these embodiments of the technology described herein can, and in an embodiment do, include any one or more or all of the features of the technology described herein described herein, as appropriate.

Thus, for example, the ray tracing acceleration data structure is in an embodiment generated in one of the manners discussed herein, and is in an embodiment generated, at least in part, in response to it being determined that a ray intersects the displacement micromapped triangular primitive.

The technology described herein correspondingly also extends to the use of the ray tracing acceleration data structures for a displacement micromapped triangular primitive in the manner of the technology described herein.

Thus, a further embodiment of the technology described herein comprises a method of operating a graphics processing system that is operable to generate a render output by performing a ray tracing process in which rays are traced for a scene to be rendered;

the method comprising:

when a ray is determined to intersect a triangular primitive for a scene being rendered that has an associated displacement micromap that stores displacement information for respective vertices of a plurality of sub-triangles that the triangular primitive is to be divided into:

traversing a ray tracing acceleration data structure for the primitive for the ray, the ray tracing acceleration data structure comprising nodes having associated bounding volumes for use when determining a sub-triangle of the triangular primitive that may be intersected by a ray, wherein the bounding volumes of the nodes of the ray tracing acceleration data structure comprise volumes having triangular ends and formed by the triangular ends and planes joining corresponding sides of the triangular ends of the volume;

the method further comprising:

performing further processing based on the traversing the ray tracing acceleration data structure for the primitive for the ray.

A further embodiment of the technology described herein comprises a graphics processor that is operable to generate a render output by performing a ray tracing process in which rays are traced for a scene to be rendered;

the graphics processor comprising:

a ray tracing acceleration data structure traversal circuit configured to, when a ray intersects a triangular primitive for a scene being rendered that has an associated displacement micromap that stores displacement information for respective vertices of a plurality of sub-triangles that the triangular primitive is to be divided into:

traverse a ray tracing acceleration data structure for the primitive for a ray, the ray tracing acceleration data structure comprising nodes having associated bounding volumes for use when determining a sub-triangle of the triangular primitive that may be intersected by a ray, wherein the bounding volumes of the nodes of the ray tracing acceleration data structure comprise volumes having triangular ends and formed by the triangular ends and planes joining corresponding sides of the triangular ends of the volume; and a processing circuit or circuits configured to perform further processing based on the traversing the ray tracing acceleration data structure for the primitive for the ray.

As will be appreciated by those skilled in the art, these embodiments of the technology described herein can, and in an embodiment do, include any one or more or all of the features of the technology described herein, as appropriate.

Thus, for example, the further processing that is performed based on traversing the ray tracing acceleration data structure for the primitive for a ray may comprise, for example, generating more of the ray tracing acceleration data structure for the displacement micromapped triangle and then traversing that further part or parts of the ray tracing acceleration data structure for the ray, or performing ray-triangle intersection tests for sub-triangles of the displacement micromapped triangle indicated by a node of the ray tracing acceleration data structure.

As discussed above, the operation in the manner of the technology described herein will be performed when a ray is determined to intersect a triangle primitive having associated displacement micromap as part of a ray tracing process. The ray tracing process can be performed in any suitable and desired manner, such as, and in an embodiment, in the normal manner for the graphics processing system and graphics processor in question.

Thus this may, for example, and in an embodiment does, comprise performing ray traversals through a scene using appropriate ray tracing acceleration data structures representative of the scene to determine, for example, and in an embodiment, which primitives, if any, for the scene, are intersected by a ray. Correspondingly, when as part of the process of tracing a ray for a scene it is determined that the ray intersects a triangular primitive having associated displacement micromap, that the processing for that ray will then be continued in the manner of the technology described herein, namely by using a ray tracing acceleration data structure in the form of the technology described herein when determining (and to determine) which sub-triangle of the primitive the ray actually intersects.

Thus, the determination that a triangular primitive having an associated displacement micromap has been intersected by a ray can be determined in any suitable and desired manner, and is in an embodiment done in the normal manner for the graphics processing system and graphics processor and ray tracing process in question. This in an embodiment uses appropriate ray tracing acceleration data structures, for example, and in an embodiment, in the form of bounding volume hierarchies (which in an embodiment use access aligned bounding boxes (AABBs) as the bounding volumes) representative of the primitives for a scene to determine which primitives, if any, a ray being traced for the render outputs intersects, and when that process determines that a triangular primitive having an associated displacement micromap has been intersected by a ray, the operation then proceeds in the manner of the technology described herein to determine a sub-triangle of the displacement micromapped triangular primitive that may be intersected by the ray.

When it is determined that a triangular primitive having an associated displacement micromap has been intersected by a ray, the ray tracing acceleration data structure for the displacement micromapped triangle will accordingly be traversed appropriately for the ray, by testing the ray against the respective bounding volumes associated with the nodes of the ray tracing acceleration data structure, to determine if the ray intersects the bounding volumes or not. When the ray is found to intersect (or to not intersect) a node's bounding volume, the traversal is continued accordingly.

As discussed above, as part of this processing, the traversal of the ray tracing acceleration data structure for a displacement micromapped triangle may trigger the generation of further parts of the ray tracing acceleration data structure for the displacement micromapped triangle in question (and the traversal of those further parts of the ray tracing acceleration data structure), or when the traversal identifies a plurality of sub-triangles that may be intersected by the ray (e.g. because the end node of the ray tracing acceleration data structure represents plural (e.g. four) sub-triangles at the lowest sub-division level), then performing appropriate ray-triangle intersection tests to determine which sub-triangle the ray intersects.

Once the particular sub-triangle of the displacement micromapped triangle that a ray intersects has been determined (e.g. because the end node of the traversal relates to a single sub-triangle in the lower sub-division level, or following appropriate ray-sub-triangle intersection tests), then further processing can be, and is in an embodiment, performed, based on the sub-triangle that has been intersected by the ray.

This further processing may comprise any suitable and desired further processing that may be performed based on which sub-triangle ray intersects. For example, it may comprise rendering (shading) a sampling position corresponding to the ray accordingly, and/or casting further (secondary) rays, etc. This processing may comprise any suitable and desired processing that can be performed for ray tracing operations in the graphics processor and graphics processing system in question.

The graphics processing system/processor may carry out ray tracing graphics processing operations in any suitable and desired manner.

The graphics processor (and graphics processing system) may correspondingly comprise any suitable and desired processing circuits, units, processors, etc., that may be required to perform ray tracing operations, and, e.g., and in an embodiment, ray tracing acceleration data structure (bounding volume hierarchy) traversals.

The graphics processing system/processor may comprise one or more programmable execution units (e.g. shader cores) operable to execute programs to perform graphics processing operations, and ray-tracing based rendering may be triggered and performed by a programmable execution unit of the graphics processing system/processor executing a graphics processing (e.g. shader) program that causes the programmable execution unit to perform ray tracing rendering processes.

In embodiments, (at least) rendering of a scene, traversal of a ray tracing acceleration data structure, and determination of ray-primitive interactions is performed by a (the) graphics processor (GPU). Thus, in embodiments, (at least) the rendering circuit is part of a (the) graphics processor (GPU).

In embodiments, the graphics processing system/processor (comprises a ray tracing circuit that) is operable to perform ray tracing by traversing a ray tracing acceleration data structure.

The graphics processor (the ray tracing circuit of the graphics processor) may be operable to (and comprise appropriate processing circuits configured to) perform ray-volume intersection tests. In this case, there may be appropriate processing circuits configured to perform ray-volume intersection tests in the case where the volumes are axis-aligned bounding boxes, and, additionally, processing circuits configured to perform ray-volume intersection tests where the volumes are in the form of volumes having triangular ends of the form of the technology described herein.

Other arrangements would, of course, be possible.

Each embodiment of the technology described herein can, and in embodiments does, include one or more, and in embodiments all, features of other embodiments of the technology described herein, as appropriate.

The technology described herein can be implemented in any suitable system, such as a suitably configured microprocessor based system. In embodiments, the technology described herein is implemented in a computer and/or micro-processor based system. The technology described herein is in embodiments implemented in a portable device, such as, and in embodiments, a mobile phone or tablet.

The technology described herein is applicable to any suitable form or configuration of graphics processor and graphics processing system, such as graphics processors (and systems) having a "pipelined" arrangement (in which case the graphics processor executes a rendering pipeline).

In embodiments, the various functions of the technology described herein are carried out on a single data processing platform that generates and outputs data, for example for a display device.

As will be appreciated by those skilled in the art, the data/graphics processing system may include, e.g., and in embodiments, a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and in embodiments does, also execute a driver for the processor and in an embodiment a compiler or compilers for compiling (e.g. shader) programs to be executed by (e.g. an (programmable) execution unit of) the processor.

The graphics processor and/or graphics processing system may also comprise, and/or be in communication with, one or more memories and/or memory devices that store the data described herein, and/or store software (e.g. (shader) program) for performing the processes described herein. The processor and/or system may also be in communication with and/or include a host microprocessor, and/or with a display for displaying images based on data generated by the processor/system.

The technology described herein can be used for all forms of input and/or output that a graphics processor may use or generate. For example, the graphics processor may execute a graphics processing pipeline that generates frames for display, render-to-texture outputs, etc. The output data values from the processing are in embodiments exported to external, e.g. main, memory, for storage and use, such as to a frame buffer for a display.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the components of the graphics processing system can otherwise include any one or more or all of the usual functional units, etc., that such components include.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a data processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

The present embodiments relate to the operation of a graphics processor, e.g. in a graphics processing system as illustrated in FIG. 1, when performing rendering of a scene to be displayed using a ray tracing-based rendering process.

Ray tracing is a rendering process which involves tracing the paths of rays of light from a viewpoint (sometimes referred to as a "camera") back through sampling positions in an image plane (which is the frame being rendered) into a scene, and simulating the effect of the interaction between the rays and objects in the scene. The output data value e.g. colour of a sampling position in the image is determined based on the object(s) in the scene intersected by the ray passing through the sampling position, and the properties of the surfaces of those objects. The ray tracing process thus involves determining, for each sampling position, a set of (zero or more) objects within the scene which a ray passing through the sampling position intersects.

Figure 2:
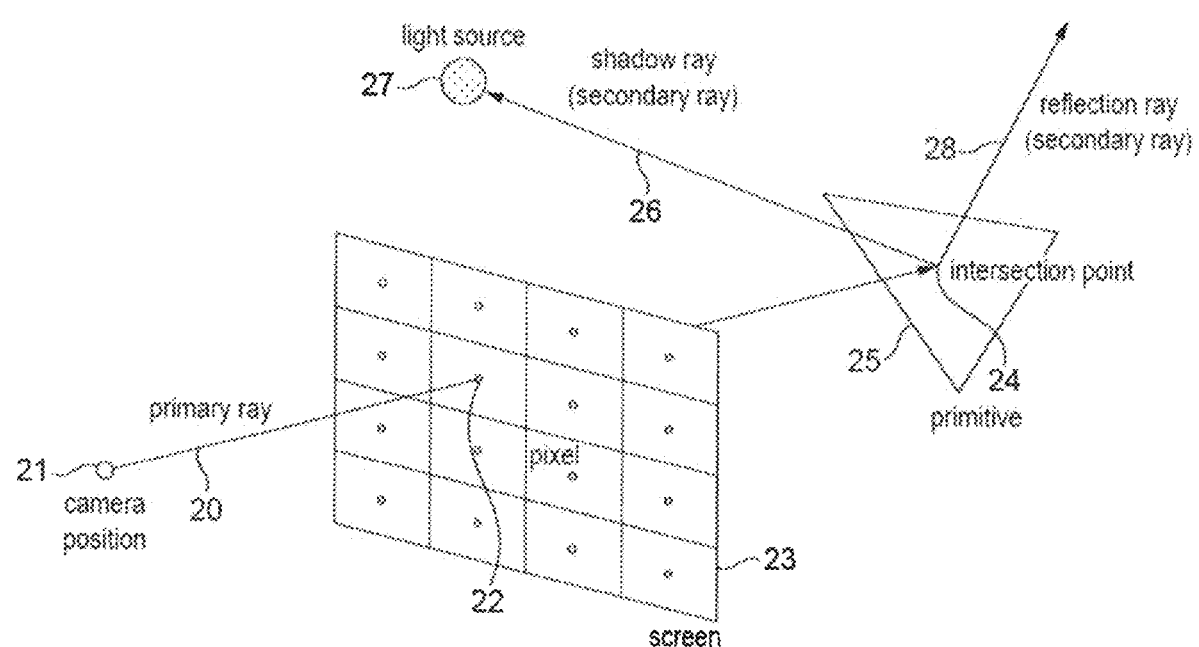
FIG. 2 is a schematic diagram illustrating a "full" ray tracing process.

FIG. 2 illustrates an exemplary "full" ray tracing process. A ray 20 (the "primary ray") is cast backward from a viewpoint 21 (e.g. camera position) through a sampling position 22 in an image plane (frame) 23 into the scene that is being rendered. The point 24 at which the ray 20 first intersects an object, which in this case is represented by a triangle primitive 25, in the scene is identified. This first intersection will be with the object in the scene closest to the sampling position.

A secondary ray in the form of shadow ray 26 may be cast from the first intersection point 24 to a light source 27. Depending upon the material of the surface of the object, another secondary ray in the form of reflected ray 28 may be traced from the intersection point 24. If the object is, at least to some degree, transparent, then a refracted secondary ray may be considered.

Such casting of secondary rays may be used where it is desired to add shadows and reflections into the image. A secondary ray may be cast in the direction of each light source (and, depending upon whether or not the light source is a point source, more than one secondary ray may be cast back to a point on the light source).

In the example shown in FIG. 2, only a single bounce of the primary ray 20 is considered, before tracing the reflected ray back to the light source. However, a higher number of bounces may be considered if desired.

The output data for the sampling position 22 i.e. a colour value (e.g. RGB value) thereof, is then determined taking into account the interactions of the primary, and any secondary, ray(s) cast, with objects in the scene. The same process is conducted in respect of each sampling position to be considered in the image plane (frame) 23.

In order to facilitate such ray tracing processing, in the present embodiments, acceleration data structures indicative of the geometry (e.g. objects) in scenes to be rendered are used when determining the intersection data for the ray(s) associated with a sampling position in the image plane to identify a subset of the geometry which a ray may intersect.

The ray tracing acceleration data structure represents and indicates the distribution of geometry (e.g. objects) in the scene being rendered, and in particular the geometry that falls within respective (sub-) volumes in the overall volume of the scene (that is being considered).

In the present embodiments, a ray tracing acceleration data structure is in the form of one or more Bounding Volume Hierarchy (BVH) trees. The use of BVH trees allows and facilitates testing a ray against a hierarchy of bounding volumes until a leaf node is found. It is then only necessary to test the geometry associated with the particular leaf node for intersection with the ray.

Figure 3A:
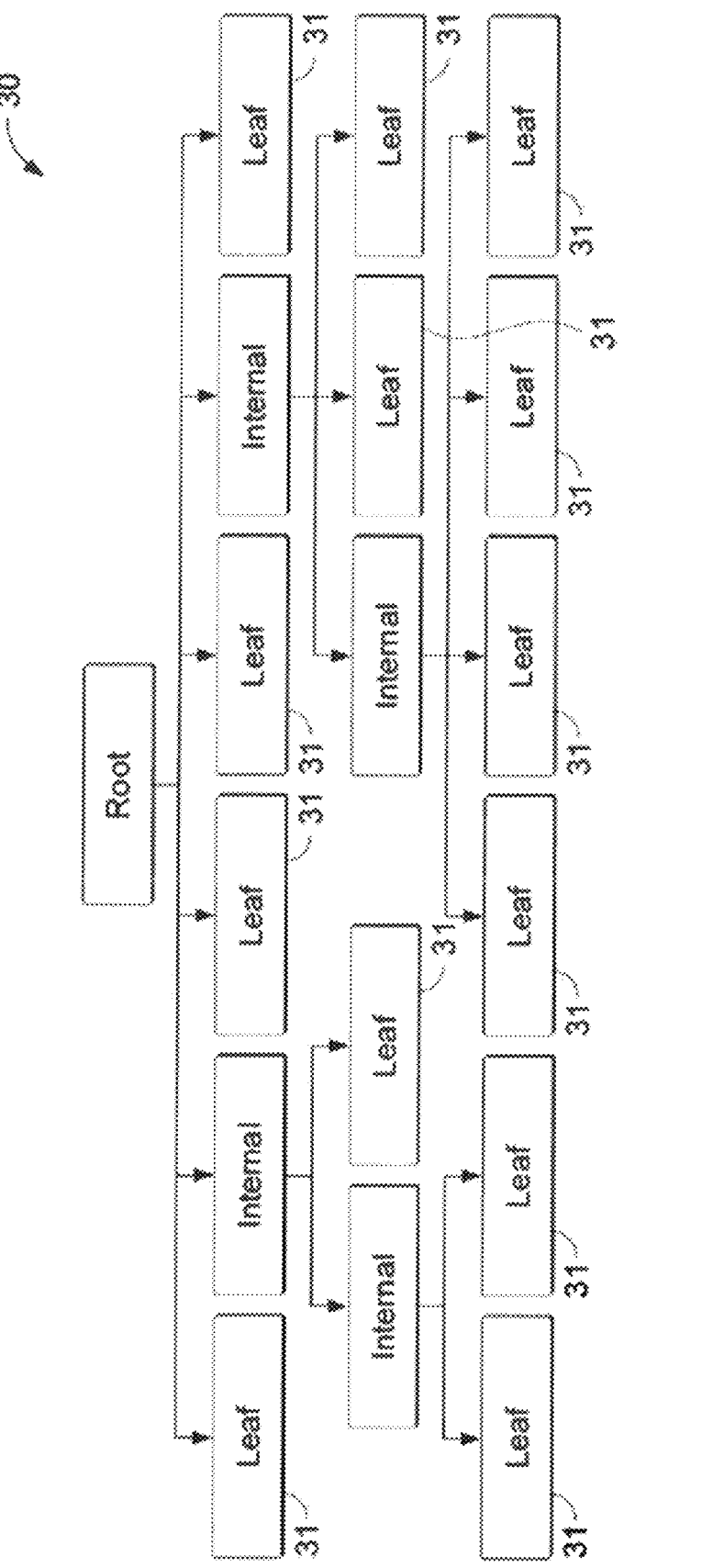
FIG. 3A and FIG. 3B show exemplary ray tracing acceleration data structures.

FIG. 3A shows an exemplary BVH tree 30, constructed by enclosing a volume in an axis-aligned bounding volume (AABV), e.g. a cube, and then recursively sub-dividing the bounding volume into successive sub-AABVs according to any suitable and desired sub-division scheme, until a desired smallest sub-division (volume) is reached.

In this example, the BVH tree 30 is a relatively "wide" tree wherein each bounding volume is sub-divided into up to six sub-AABVs. However, in general, any other suitable tree structure may be used, and a given node of the tree may have any suitable and desired number of child nodes.

Thus, each node in the BVH tree 30 will have a respective volume associated with it, with the end, leaf nodes 31 each representing a particular smallest sub-divided volume, and any parent node representing, and being associated with, the volume of its child nodes.

A complete scene may be represented by a single BVH tree, e.g. with the tree storing the geometry for the scene, e.g. in world space. In this case, each leaf node of the BVH tree 30 may be associated with the geometry defined for the scene that falls, at least in part, within the volume that the leaf node corresponds to (e.g. whose centroid falls within the volume in question). The leaf nodes 31 may represent unique (non-overlapping) subsets of primitives defined for the scene falling within the corresponding volumes for the leaf nodes 31.

Figure 3B:
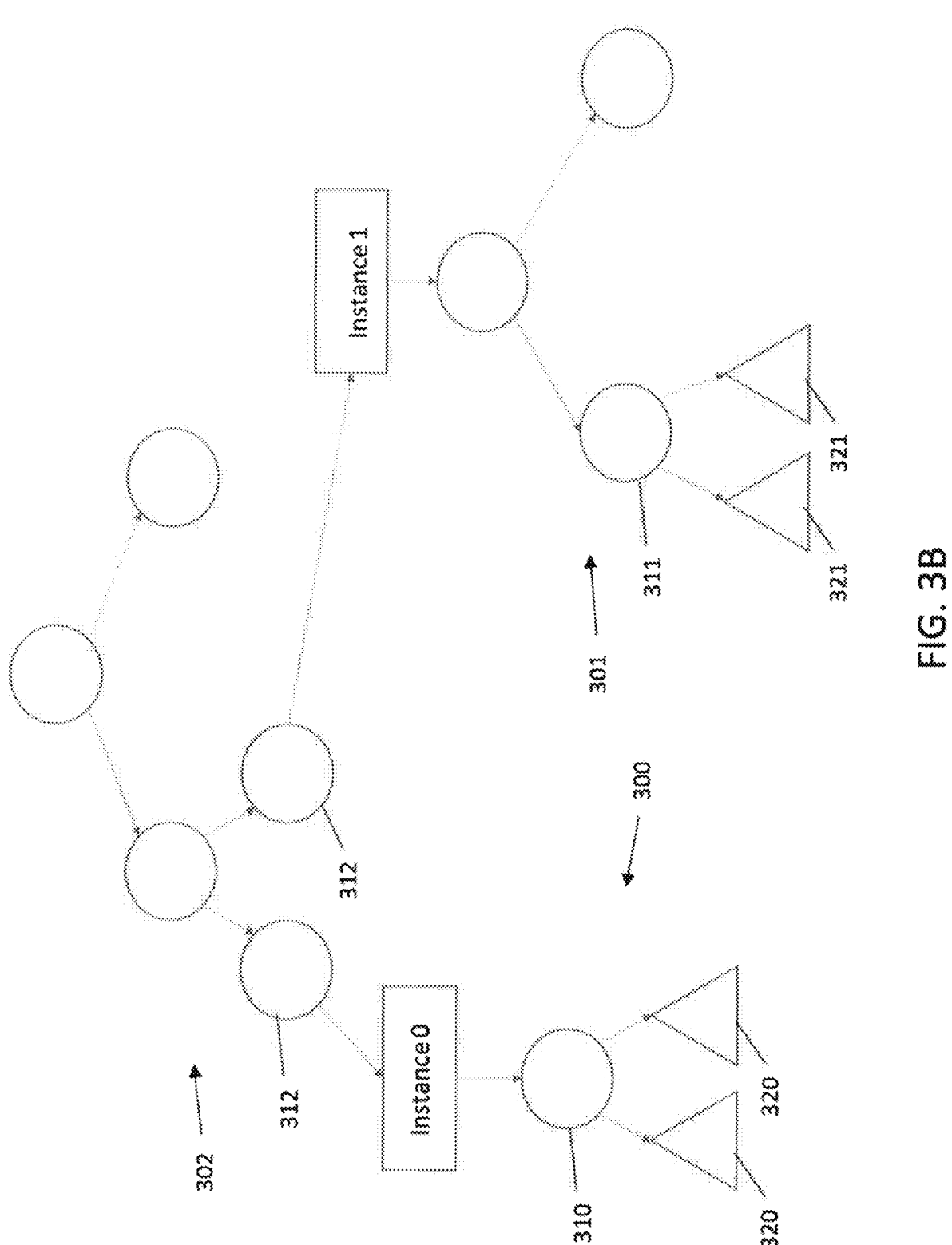

In the present embodiments, a two-level ray tracing acceleration data structure is used. FIG. 3B shows an exemplary two-level ray tracing acceleration data structure in which each instance or object is associated with a respective bottom-level acceleration structure (BLAS) 300, 301, which in the present embodiments is in the form of a respective BVH tree that stores geometry in a model space, with each leaf node 310, 311 of the BVH tree representing a unique subset of primitives 320, 321 defined for the instance or object falling within the corresponding volume.

A separate top-level acceleration structure (TLAS) 302 then contains references to the set of bottom-level acceleration structures (BLAS), together with a respective set of shading and transformation information for each bottom-level acceleration structure (BLAS). In the present embodiments, the top-level acceleration structure (TLAS) 302 is defined in a "top-level" space (e.g. world space) and is in the form of a BVH tree having leaf nodes 312 that each point to one or more of the bottom-level acceleration structures (BLAS) 300, 301.

Other forms of ray tracing acceleration data structure would be possible.

Figure 4A:
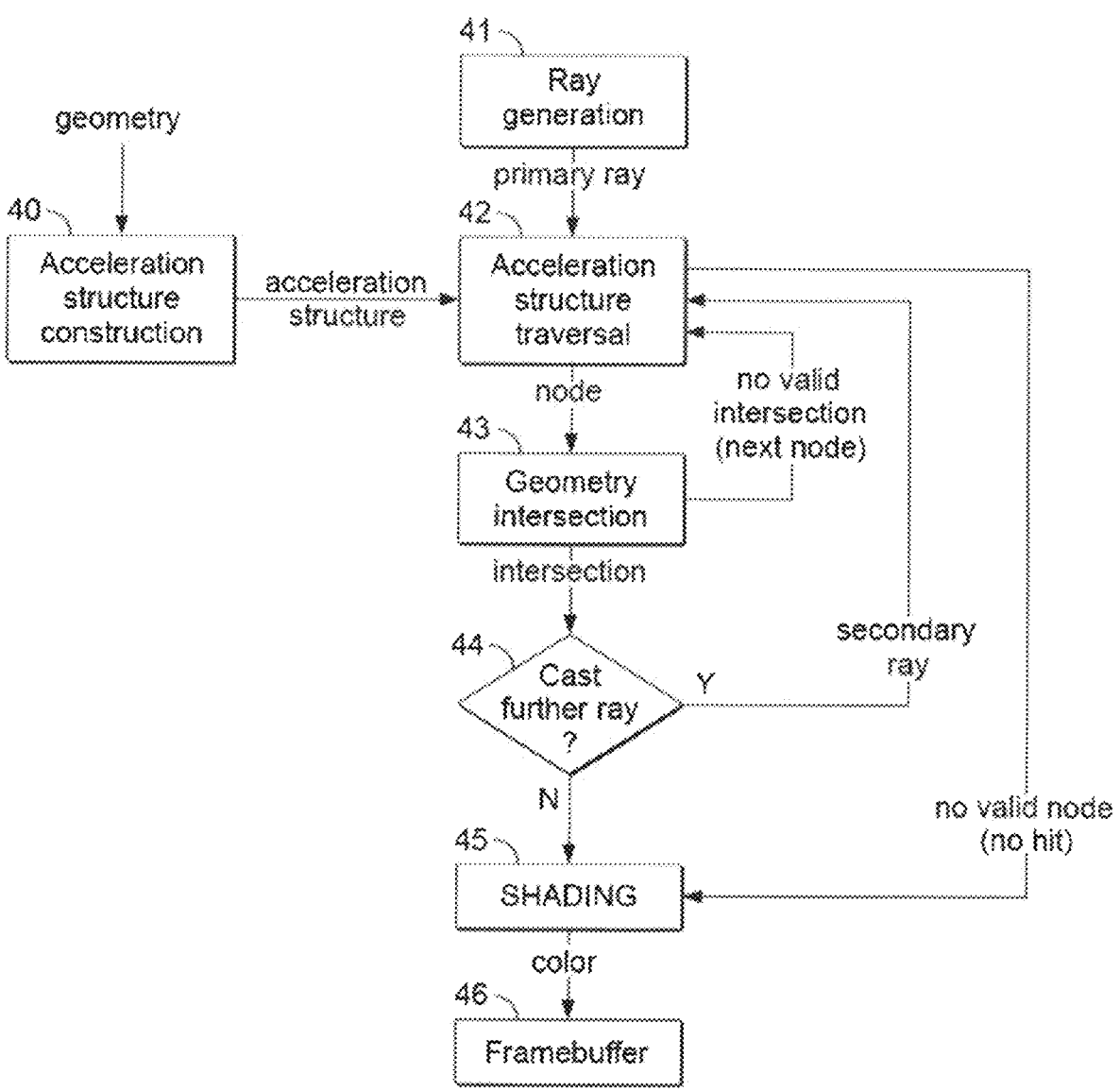
FIG. 4A and FIG. 4B are flow charts illustrating embodiments of a full ray tracing process.

FIG. 4A is a flow chart showing an overall ray tracing process that may be performed on and by the graphics processor 2.

First, the geometry of the scene is analysed and used to obtain an acceleration data structure (step 40), for example in the form of one or more BVH tree structures, as discussed above. This can be done in any suitable and desired manner, for example by means of an initial processing pass on the graphics processor 2.

A primary ray is then generated, passing from a camera through a particular sampling position in an image plane (frame) (step 41). The acceleration data structure is then traversed for the primary ray (step 42), and the leaf node corresponding to the first volume that the ray passes through which contains geometry which the ray potentially intersects is identified. It is then determined whether the ray intersects any of the geometry, e.g. primitives, (if any) in that leaf node (step 43).

If no (valid) geometry which the ray intersects can be identified in the node, the process returns to step 42, and the ray continues to traverse the acceleration data structure and the leaf node for the next volume that the ray passes through which may contain geometry with which the ray intersects is identified, and a test for intersection performed at step 43.

This is repeated for each leaf node that the ray (potentially) intersects, until geometry that the ray intersects is identified.

When geometry that the ray intersects is identified, it is then determined whether to cast any further (secondary) rays for the primary ray (and thus sampling position) in question (step 44). This may be based, e.g., and in an embodiment, on the nature of the geometry (e.g. its surface properties) that the ray has been found to intersect, and the complexity of the ray tracing process being used.

Thus, as shown in FIG. 4A, one or more secondary rays may be generated emanating from the intersection point (e.g. a shadow ray(s), a refraction ray(s) and/or a reflection ray(s), etc.). Steps 42, 43 and 44 are then performed in relation to each secondary ray.

Once there are no further rays to be cast, a shaded colour for the sampling position that the ray(s) correspond to is then determined based on the result(s) of the casting of the primary ray, and any secondary rays considered (step 45), taking into account the properties of the surface of the object at the primary intersection point, any geometry intersected by secondary rays, etc. The shaded colour for the sampling position is then stored in the frame buffer (step 46).

If no (valid) node which may include geometry intersected by a given ray (whether primary or secondary) can be identified in step 42 (and there are no further rays to be cast for the sampling position), the process moves to step 45, and shading is performed. In this case, the shading is in an embodiment based on some form of "default" shading operation that is to be performed in the case that no intersected geometry is found for a ray. This could comprise, e.g., simply allocating a default colour to the sampling position, and/or having a defined, default geometry to be used in the case where no actual geometry intersection in the scene is found, with the sampling position then being shaded in accordance with that default geometry. Other arrangements are possible.

This process is performed for each sampling position to be considered in the image plane (frame). Once the final output value for the sampling position in question has been generated, the processing in respect of that sampling position is completed. A next sampling position may then be processed in a similar manner, and so on, until all the sampling positions for the frame have been appropriately shaded. The frame may then be output, e.g. for display, and the next frame to be rendered processed in a similar manner, and so on.

Figure 4B:
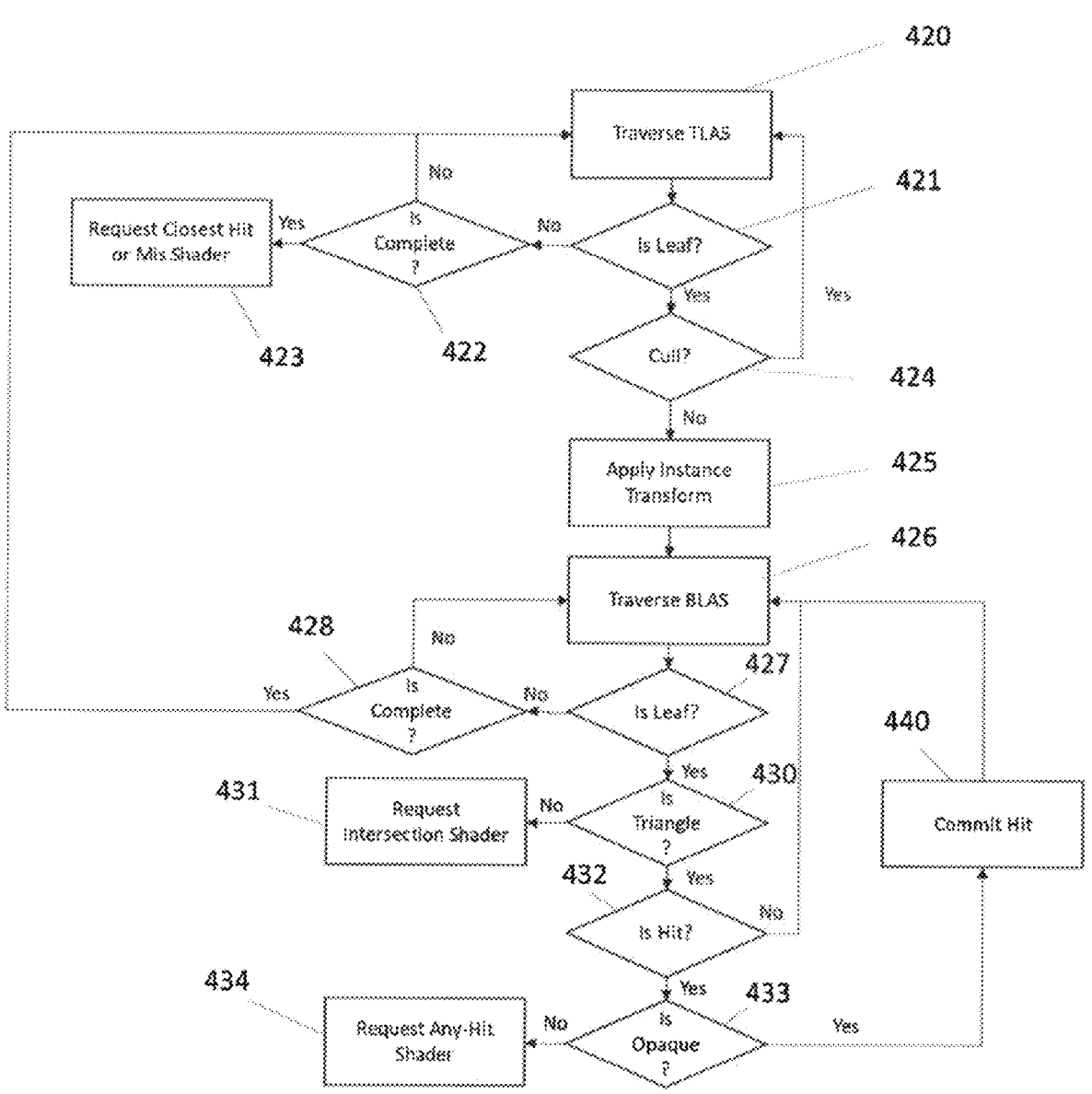

FIG. 4B is a flow chart showing in more detail acceleration structure traversal in the case of a two-level acceleration data structure, e.g. as described above with reference to FIG. 3B. As shown in FIG. 4B, in this case, acceleration structure traversal begins with TLAS traversal (step 420), and TLAS traversal continues in search of a TLAS leaf node (steps 421, 422). If no TLAS leaf node can be identified, a "default" shading operation ("miss shader") may be performed (step 423), e.g. as described above.

When (at step 421) a TLAS leaf node is identified, it is determined whether that leaf node can be culled from further processing (step 424). If it can be culled from further processing, the process returns to TLAS traversal (step 420).

If the TLAS leaf node cannot be culled from further processing, instance transform information associated with the leaf node is used to transform the ray to the appropriate space for BLAS traversal (step 425). BLAS traversal then begins (step 426), and continues in search of a BLAS leaf node (steps 427, 428). If no BLAS leaf node can be identified, the process may return to TLAS traversal (step 420).

In the present embodiments, geometry associated with a BLAS leaf node can be in the form of a set of triangle primitives or an axis aligned bounding box (AABB) primitive. When (at step 427) a BLAS leaf node is identified, it is determined whether geometry associated with the leaf node is in the form of a set of triangle primitives or an axis aligned bounding box (AABB) primitive (step 430).

As shown in FIG. 4B, when an axis aligned bounding box (AABB) primitive is encountered, execution of a shader program ("intersection shader") that defines a procedural object encompassed by the axis aligned bounding box (AABB) is triggered (step 431) to determine whether a ray intersects the procedural object defined by the shader program. On the other hand, when a set of triangle primitives is encountered, determining whether a ray intersects any of the triangle primitives is performed by fixed function circuitry (circuit) (step 432). Other arrangements would be possible.

If no (valid) triangle primitives which the ray intersects can be identified in the node, the process returns to BLAS traversal (step 426).

If a ray is found to intersect a triangle primitive 25, it is determined whether or not the triangle primitive 25 is opaque at the intersection point 24 (step 433). In the case of the triangle primitive intersection point 24 being found to be non-opaque, execution of an appropriate shader program ("any-hit shader") may be triggered (step 434). Otherwise, in the case of the triangle primitive intersection point 24 being found to be opaque, the intersection can be committed without executing a shader program (step 440). Traversal for one or more secondary rays may be triggered, as appropriate, e.g. as discussed above.

Figure 5:
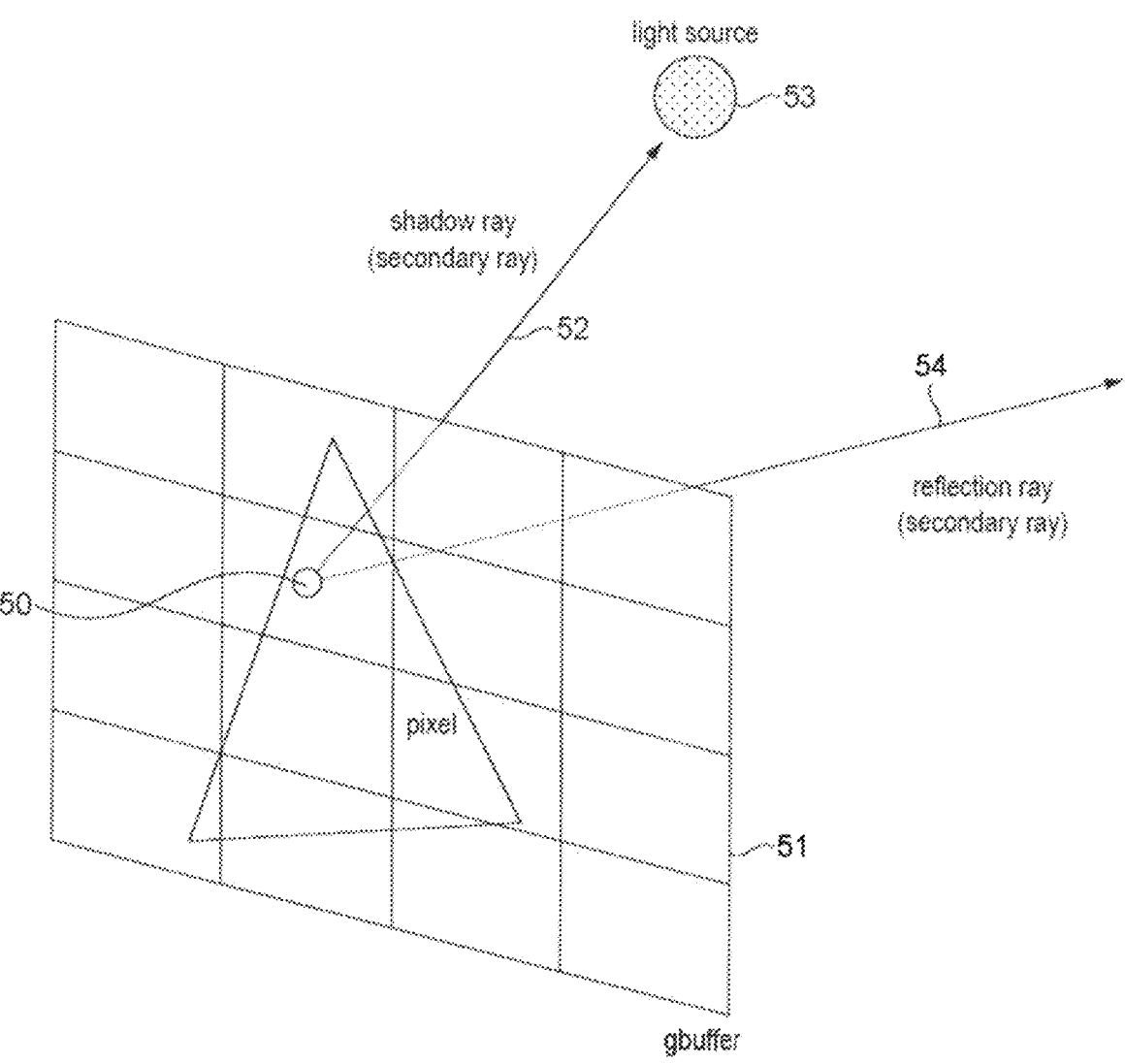
FIG. 5 is a schematic diagram illustrating a "hybrid" ray tracing process.

FIG. 5 shows an alternative ray tracing process which may be used in embodiments of the technology described herein, in which only some of the steps of the full ray tracing process described above are performed. Such an alternative ray tracing process may be referred to as a "hybrid" ray tracing process.

In this process, as shown in FIG. 5, the first intersection point 50 for each sampling position in the image plane (frame) is instead determined first using a rasterisation process and stored in an intermediate data structure known as a "G-buffer" 51. Thus, the process of generating a primary ray for each sampling position, and identifying the first intersection point of the primary ray with geometry in the scene, is replaced with an initial rasterisation process to generate the "G-buffer". The G-buffer includes information indicative of the depth, colour, normal and surface properties (and any other appropriate and desired data, e.g. albedo, etc.) for each first (closest) intersection point for each sampling position in the image plane (frame).

Secondary rays, e.g. shadow ray 52 to light source 53, and reflection ray 54, may then be cast starting from the first intersection point 50, and the shading of the sampling positions determined based on the properties of the geometry first intersected, and the interactions of the secondary rays with geometry in the scene.

Referring to the flowchart of FIG. 4A, in such a hybrid process, the initial pass of steps 41, 42 and 43 of the full ray tracing process for a primary ray will be omitted, as there is no need to cast primary rays and determine their first intersection with geometry in the scene. The first intersection point data for each sampling position is instead obtained from the G-buffer.

The process may then proceed to the shading stage 45 based on the first intersection point for each pixel obtained from the G-buffer, or where secondary rays emanating from the first intersection point are to be considered, these will need to be cast in the manner described by reference to FIG. 4. Thus, steps 42, 43 and 44 will be performed in the same manner as previously described in relation to the full ray tracing process for any secondary rays.

The colour determined for a sampling position will be written to the frame buffer in the same manner as step 46 of FIG. 4A, based on the shading colour determined for the sampling position based on the first intersection point (as obtained from the G-buffer), and, where applicable, the intersections of any secondary rays with objects in the scene, determined using ray tracing.

Figure 6:
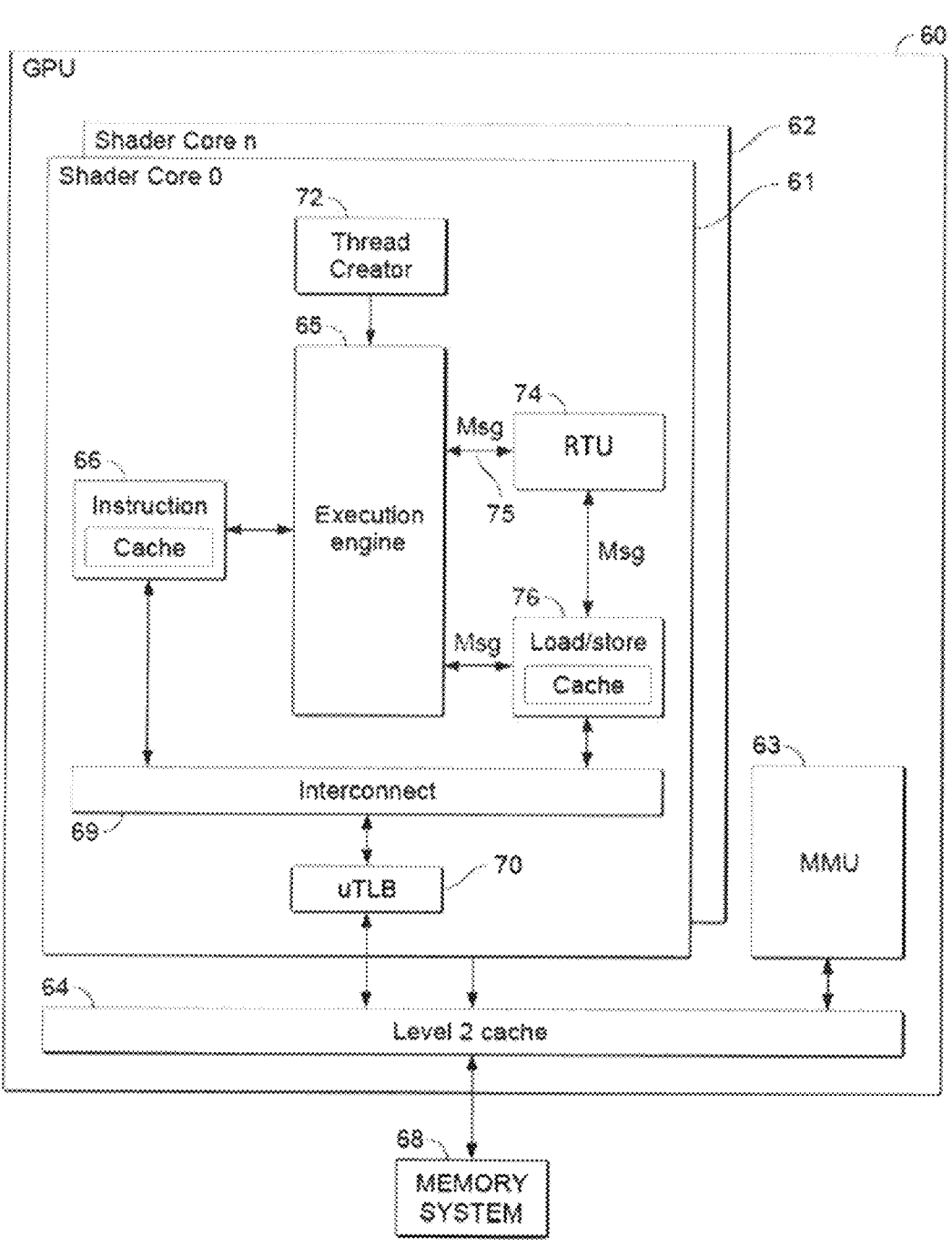
FIG. 6 shows schematically an embodiment of a graphics processor that can be operated in the manner of the technology described herein.

FIG. 6 shows schematically the relevant elements and components of a graphics processor (GPU) 2, 60 of the present embodiments.

As shown in FIG. 6, the GPU 60 includes one or more shader (processing) cores 61, 62 together with a memory management unit ("MMU") 63 and a level 2 cache 64 which is operable to communicate with an off-chip memory system 68 (e.g. via an appropriate interconnect and (dynamic) memory controller).

FIG. 6 shows schematically the relevant configuration of one shader core 61, but as will be appreciated by those skilled in the art, any further shader cores of the graphics processor 60 will be configured in a corresponding manner.

The graphics processor (GPU) shader cores 61, 62 are programmable processing units (circuits) that perform processing operations by running small programs for each "item" in an output to be generated such as a render target, e.g. frame. An "item" in this regard may be, e.g. a vertex, one or more sampling positions, etc. The shader cores will process each "item" by means of one or more execution threads which will execute the instructions of the shader program(s) in question for the "item" in question. Typically, there will be multiple execution threads each executing at the same time (in parallel).

FIG. 6 shows the main elements of the graphics processor 60 that are relevant to the operation of the present embodiments. As will be appreciated by those skilled in the art there may be other elements of the graphics processor 60 that are not illustrated in FIG. 6. It should also be noted here that FIG. 6 is only schematic, and that, for example, in practice the shown functional units may share significant hardware circuits, even though they are shown schematically as separate units in FIG. 6. It will also be appreciated that each of the elements and units, etc., of the graphics processor as shown in FIG. 6 may, unless otherwise indicated, be implemented as desired and will accordingly comprise, e.g., appropriate circuits (processing logic), etc., for performing the necessary operation and functions.

As shown in FIG. 6, each shader core of the graphics processor 60 includes an appropriate programmable execution unit (execution engine) 65 that is operable to execute graphics shader programs for execution threads to perform graphics processing operations.

The shader core 61 also includes an instruction cache 66 that stores instructions to be executed by the programmable execution unit 65 to perform graphics processing operations. The instructions to be executed will, as shown in FIG. 6, be fetched from the memory system 68 via an interconnect 69 and a micro-TLB (translation lookaside buffer) 70.

The shader core 61 also includes an appropriate load/store unit 76 in communication with the programmable execution unit 65, that is operable, e.g., to load into an appropriate cache, data, etc., to be processed by the programmable execution unit 65, and to write data back to the memory system 68 (for data loads and stores for programs executed in the programmable execution unit). Again, such data will be fetched/stored by the load/store unit 76 via the interconnect 69 and the micro-TLB 70.

In order to perform graphics processing operations, the programmable execution unit 65 will execute graphics shader programs (sequences of instructions) for respective execution threads (e.g. corresponding to respective sampling positions of a frame to be rendered). Accordingly, as shown in FIG. 6, the shader core 61 further comprises a thread creator (generator) 72 operable to generate execution threads for execution by the programmable execution unit 65.

As shown in FIG. 6, the shader core 61 in this embodiment also includes a ray tracing circuit (unit) ("RTU") 74, which is in communication with the programmable execution unit 65, and which is operable to perform the required ray-volume testing during the ray tracing acceleration data structure traversals (e.g. the operation of steps 420 and 426 of FIG. 4B) for rays being processed as part of a ray tracing-based rendering process, in response to messages 75 received from the programmable execution unit 65. In the present embodiments the RTU 74 is also operable to perform the required ray-triangle testing (e.g. the operation of step 432 of FIG. 4B). The RTU 74 is also able to communicate with the load/store unit 76 for loading in the required data for such intersection testing.

In the present embodiments, the RTU 74 of the graphics processor is a (substantially) fixed-function hardware unit (circuit) that is configured to perform the required ray-volume and ray-triangle intersection testing during a traversal of a ray tracing acceleration data structure to determine geometry for a scene to be rendered that may be (and is) intersected by a ray being used for a ray tracing operation. However, some amount of configurability may be provided.

Other arrangements would be possible. For example, ray-volume and/or ray-triangle intersection testing may be performed by the programmable execution unit 65 (e.g. in software).

The technology described herein and the present embodiments are particularly concerned with the case where a triangular primitive has an associated "displacement" micromap.

A displacement micromap sub-divides a triangular primitive into a plurality of sub-triangles (micro-triangles), each of which may be displaced in different ways relative to a reference plane (the plane of the "base" triangle that the displacement micromap applies to). A displacement micromap thus sub-divides a triangle primitive into a micromesh of "displaced" sub-triangles. This can allow fine detail geometry information to be more efficiently encoded and processed.

FIG. 7 illustrates a basic micromap sub-division of a triangle primitive 700 into three different possible micro-meshes of sub-triangles.

Figure 7A:
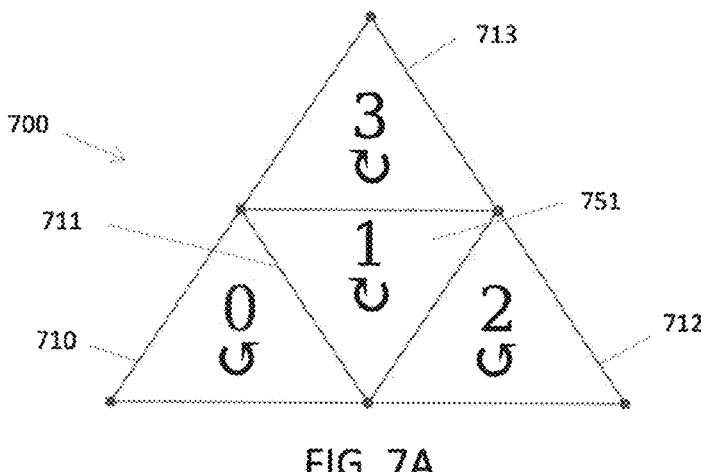
FIG. 7A, FIG. 7B and FIG. 7C illustrate micromap sub-division and indexing.

FIG. 7A shows a first "level" of sub-division, in which a triangle primitive 700 is sub-divided into a micromesh of four equally sized and shaped sub-triangles 710-713. As illustrated in FIG. 7A, each such first-level sub-triangle 710-713 is associated with an index (0-3) that uniquely identifies the respective first-level sub-triangle (at the first sub-division level). As illustrated in FIG. 7A, the indices are defined in a predetermined (e.g. API defined) order on the basis of a first-level area filling curve 751.

In these examples, as illustrated in FIG. 7, an area filling curve is based on traversing triangle edges with alternating winding directions (e.g. as described in the Vulkan specification). Other arrangements may be possible.

Figure 7B:
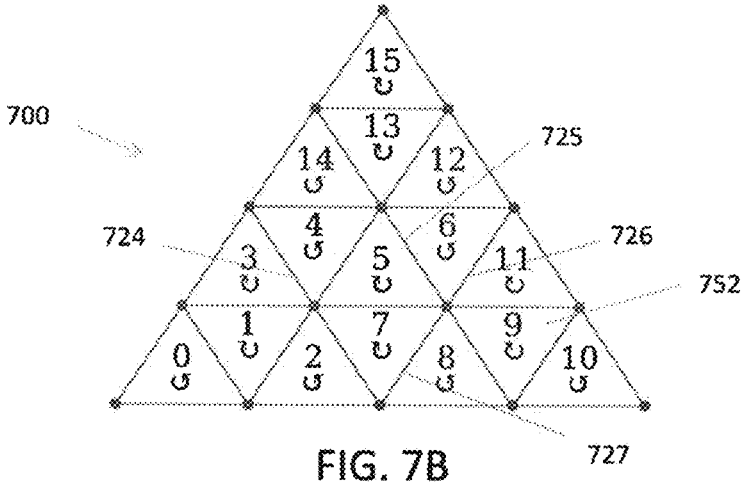

FIG. 7B shows a second level of sub-division, in which triangle primitive 700 is sub-divided into a micromesh of sixteen equally sized and shaped sub-triangles. In this case, each of the first-level sub-triangles 710-713 is effectively sub-divided into four equally sized and shaped second-level sub-triangles. For example, first-level sub-triangle 711 is sub-divided into four second-level sub-triangles 724-727. As illustrated in FIG. 7B, each second-level sub-triangle is associated with an index (0-15) that uniquely identifies the respective second-level sub-triangle (at the second sub-division level). As illustrated in FIG. 7B, the indices are defined in a predetermined (e.g. API defined) order on the basis of a second-level area filling curve 752.

Figure 7C:
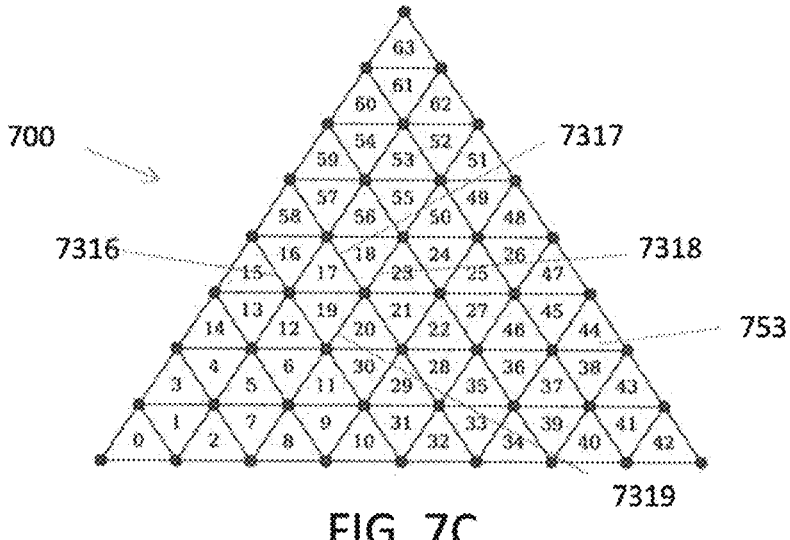

FIG. 7C shows a third level of sub-division, in which triangle primitive 700 is sub-divided into a micromesh of sixty-four equally sized and shaped sub-triangles. In this case, each of the second-level sub-triangles is effectively sub-divided into four equally sized and shaped third-level sub-triangles. For example, second-level sub-triangle 724 is sub-divided into four third-level sub-triangles 7316-7319. As illustrated in FIG. 7C, each third-level sub-triangle is associated with an index (0-63) that uniquely identifies the respective third-level sub-triangle (at the third sub-division level). As illustrated in FIG. 7C, the indices are defined in a predetermined (e.g. API defined) order on the basis of a third-level area filling curve 753.

Higher sub-division levels can be defined in a similar manner, i.e. by sub-dividing a triangle primitive into a micromesh of $2^{2n}$ equally sized and shaped sub-triangles, where n is the (integer) sub-division level. In principle, any sub-division level would be possible. In practice, there may typically be an upper limit on sub-division level, such as $n \leq 16$.

In the case of a displacement micromap, the vertices of the respective micro-triangles at each level of the micromap sub-division, as illustrated in FIGS. 7A, 7B and 7C, for example, can be displaced from the flat plane of the "base" triangle, so as to create more detailed geometry.

Figure 8:
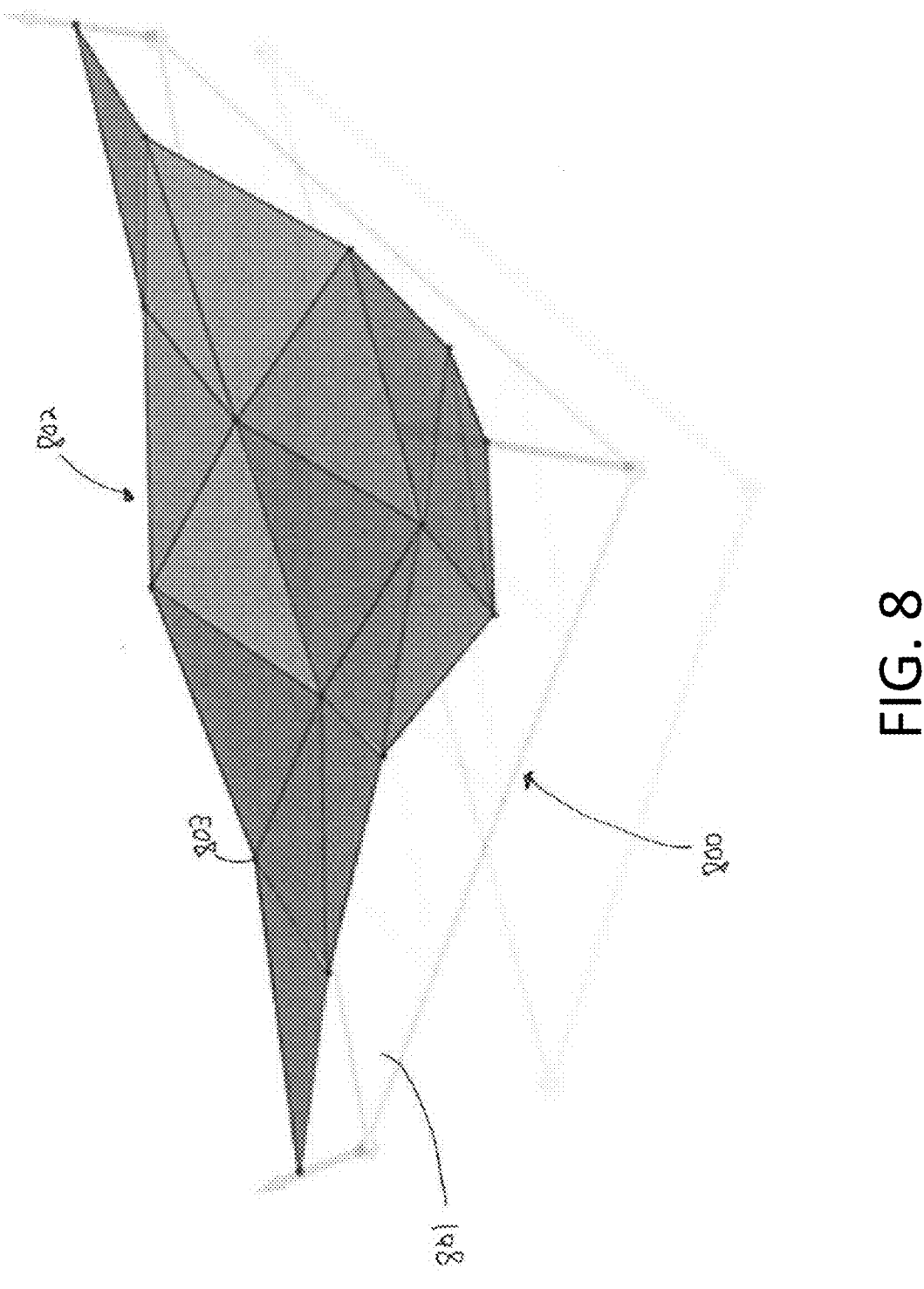
FIG. 8 shows an exemplary displacement micromapped triangle.

FIG. 8 illustrates this, and shows an exemplary base triangle 800 that is sub-divided into a plurality of sub-triangles (micro-triangles) 801, and then the corresponding configuration 802 of the sub-triangles 801 once the respective displacements indicated by the displacement micromap have been applied to the vertices of the sub-triangles.

It can be seen from FIG. 8 that the displacement micromap generates more fine detail geometry from the base triangle 800.

Figure 9:
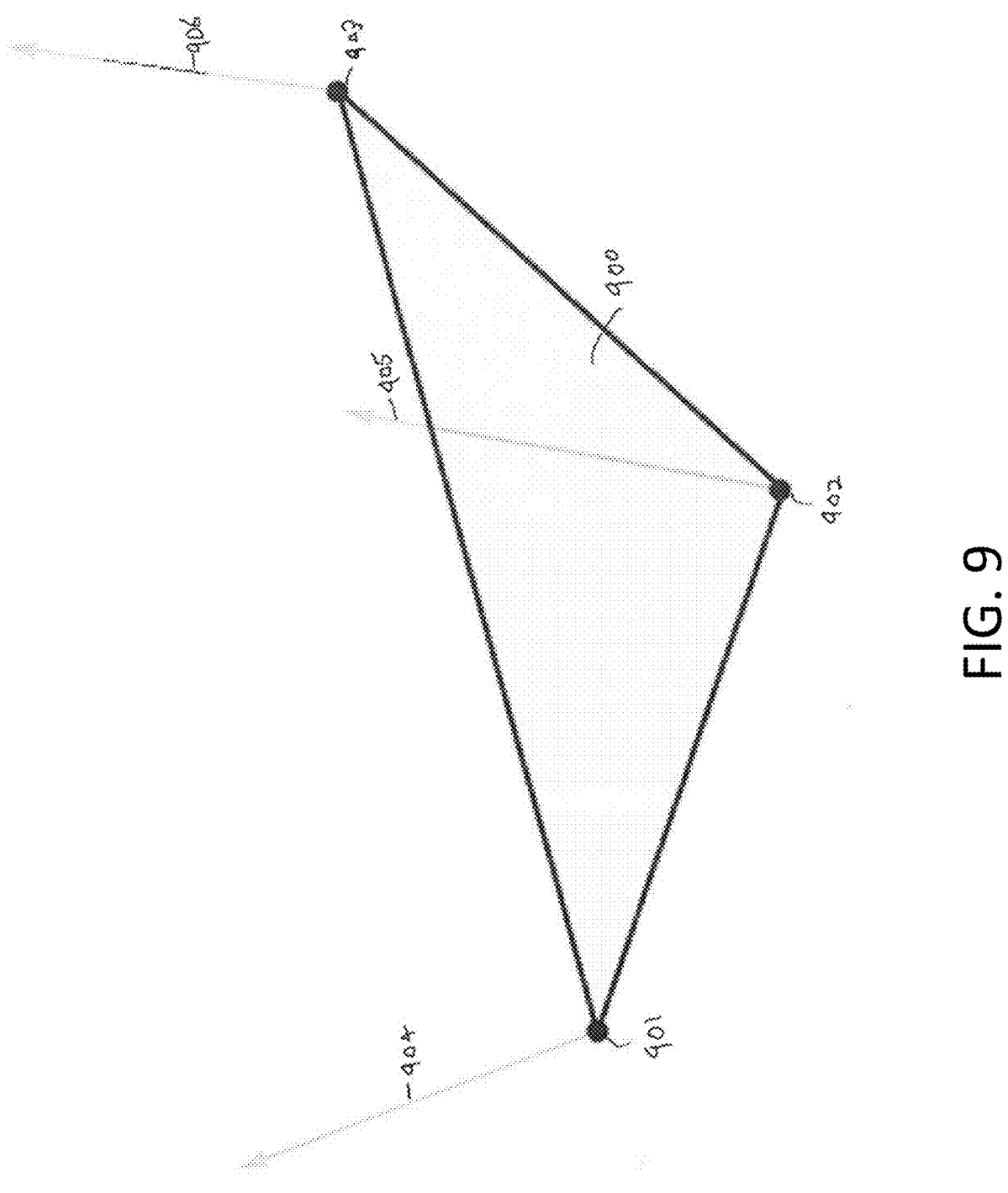
FIG. 9 shows schematically a base triangle to which a displacement micromap may be applied.

As illustrated in FIG. 9, a displacement micromap for a triangle will indicate respective vertices (vertex positions) 901, 902, 903 for the base triangle 900, and also a respective displacement vector 904, 905, 906 for each vertex of the "base" triangle 900 that the micromap is to be applied to. The micromap will then also indicate appropriate (scaler) displacement values for each vertex 803 (FIG. 8) of a sub-triangle (micro-triangle) that the base triangle is to be sub-divided into.

This information can then be used to determine the vertex positions for each displaced sub-triangle at any given level of sub-division for the micromap.

In particular, the position of a vertex for a sub-triangle defined by the displacement micromap is determined by determining an "undisplaced" position for that sub-triangle vertex by appropriate interpolation of the undisplaced vertex positions for the base triangle, based on the position of the sub-triangle vertex (micro-vertex) in question (in barycentric coordinates), and then adding to that "undisplaced" position for the sub-triangle vertex, a "displacement" which is determined by determining a displacement vector for the vertex of the sub-triangle by appropriately interpolating the defined displacement vectors for a base triangle based on the position (in barycentric coordinates) within the base triangle of the sub-triangle vertex in question, and then scaling that determined displacement vector by the indicated displacement factor for the sub-triangle vertex in question.

That determined displacement is then applied to the undisplaced sub-triangle vertex position, to give the actual (displaced) vertex position for the sub-triangle vertex.

This will be done for each vertex of a given sub-triangle, so as to thereby define the position of the sub-triangle as defined by the displacement micromap.

In the case where a triangular primitive having an associated displacement micromap is determined to be intersected by a ray, then it is necessary to determine which sub-triangle of the micromap the ray actually intersects (as that will then define, for example, the surface that the ray intersects, and at what angle the ray hits the surface, etc.). This could be determined simply by testing the ray for intersection with each of the sub-triangles defined by the micromap at the appropriate micromap sub-division level. However, the Applicants have recognised that that could require, for example, performing ray-triangle intersection tests for a large number of sub-triangles.

Accordingly, in the present embodiments, an appropriate bounding volume hierarchy is generated for a triangle having an associated displacement micromap, to provide an acceleration data structure for accelerating the determination of which sub-triangle a ray actually intersects for a triangular primitive having an associated displacement micromap.

Thus, when a ray is determined to intersect a triangle having an associated displacement micromap, an appropriate bounding volume hierarchy ray tracing acceleration data structure representative of the sub-triangles defined by the displacement micromap for the intersected triangle is traversed to assist in, and accelerate the process of, determining which sub-triangle defined by the displacement micromap is actually intersected by the ray.

In the present embodiments, a bounding volume hierarchy of the basic form shown in FIG. 3A, for example, is used to represent a displacement micromapped triangle, with each node of the ray tracing acceleration data structure representing a corresponding sub-triangle of the displacement micro-mapped triangle at the respective micromap sub-division level in question.

Thus, the ray tracing acceleration data structure for a given displacement micromapped triangle will have a root node that represents the base triangle that the displacement micromap is to be applied to, with that root node then having four child nodes, each representing a sub-triangle at the first level of sub-division of the base triangle. Each such child node will then itself have four child nodes, each representing a respective sub-triangle at the next level of sub-division within the sub-triangle that the parent node in question represents (and so on, as required).

Figure 10:
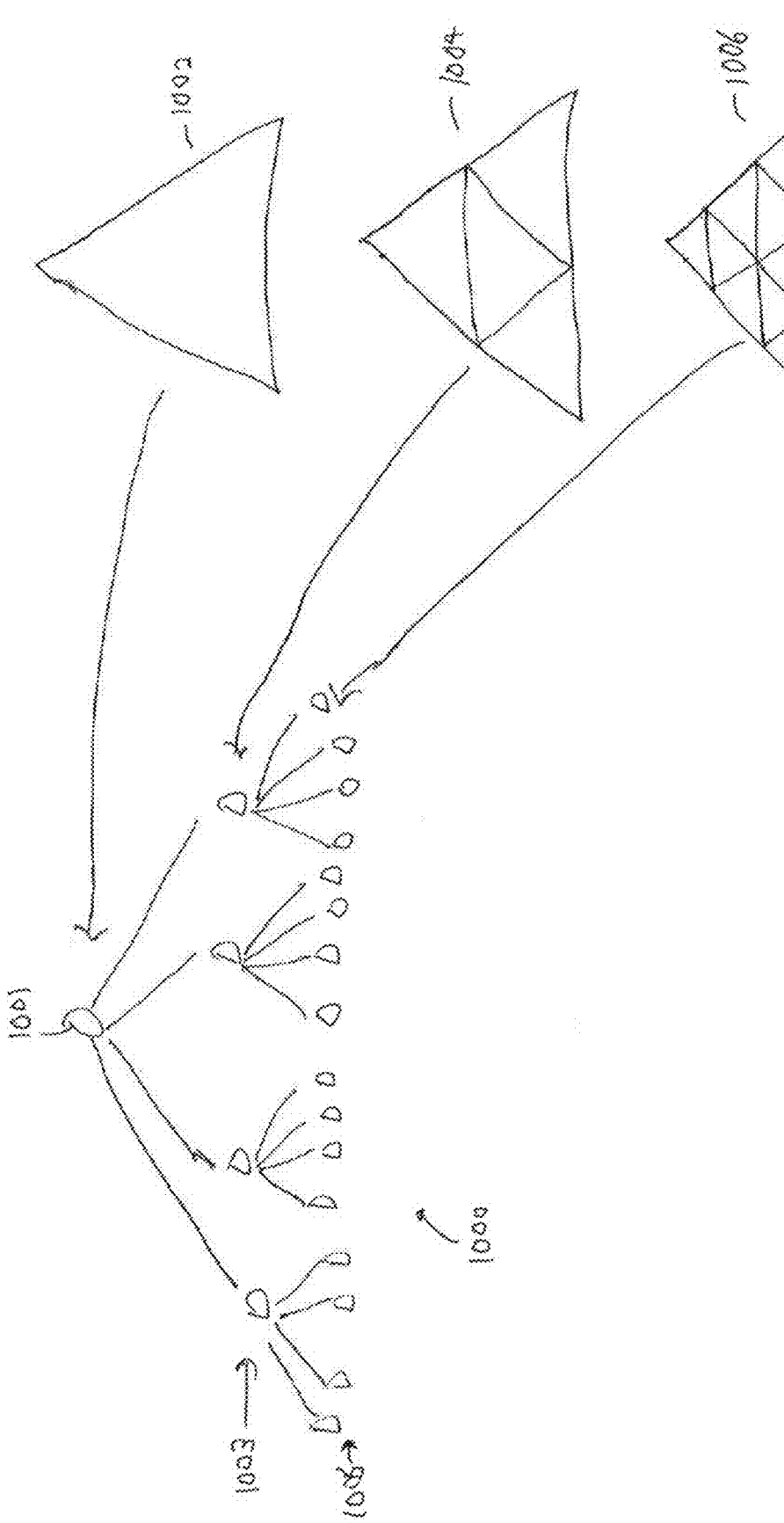
FIG. 10 shows schematically a ray tracing acceleration data structure for a displacement micromapped triangle in embodiments of the technology described herein.

FIG. 10 illustrates this, and shows a respective ray tracing acceleration data structure 1000 having a root node 1001 representing the base triangle 1002, a first level of child nodes 1003 representing the first level of sub-division 1004 of the base triangle, and a second level of child nodes 1005 representing the second level of sub-division 1006 of the base triangle.

It would be possible in this regard for the ray tracing acceleration data structure to represent a displacement micromapped triangle all the way down to the lowest level of sub-division (i.e. such that each end (leaf) node of the ray tracing acceleration data structure corresponds to a single sub-triangle at the lowest level of sub-division).

In the present embodiments, this is not done, and the ray tracing acceleration data structure represents the sub-division of the displacement micromapped triangle down to the penultimate sub-division level. Thus in the present embodiments, each end (leaf) node of the ray tracing acceleration data structure 1000 for a displacement micromapped triangle will represent four triangles of the lowest level of sub-division. This being the case, and as will be discussed in more detail below, when a leaf node in the ray tracing acceleration data structure for a displacement micromapped triangle is reached for a ray, the ray will then be tested against each of the four sub-triangles that that leaf node represents (by performing appropriate ray-triangle intersection tests), to determine which individual sub-triangle at the lowest micromapped sub-division level the ray actually intersects.

Each node of the ray tracing acceleration data structure for a displacement micromapped triangle has a corresponding bounding volume, representing the volume within which the sub-triangle (at the respective sub-division level) that the node represents falls within (i.e. such that if a ray does not intersect the bounding volume associated with a node, it can be concluded that the ray will not intersect the sub-triangle that the node represents (and any sub-triangles within that sub-triangle at lower sub-division levels of the displacement micromap)). Accordingly, the ray tracing acceleration data structure for a displacement micromapped triangle can be traversed for rays, by performing an appropriate ray-volume intersection tests, to allow it to be determined which sub-triangle of a displacement micromapped triangle a ray actually intersects.

In the present embodiments, the bounding volumes that are associated with the nodes of the ray tracing acceleration data structure for a displacement micromapped triangle are in the form of volumes having triangular ends and formed by the triangular ends and planes joining corresponding sides of the triangular ends of the volume.

In particular, each node has associated with it a bounding volume that has as one of its ends the sub-triangle formed by the undisplaced positions of the vertices for that sub-triangle, with its other end being formed by the sub-triangle that is formed by the displaced positions of the vertices for the sub-triangle (the displaced sub-triangle). (The sides of the volume are then the planes joining the respective sides of the undisplaced and displaced sub-triangles.)

Such a bounding volume is constructed for each node of the ray tracing acceleration data structure that is generated for the displacement micromapped triangle.

Figure 11:
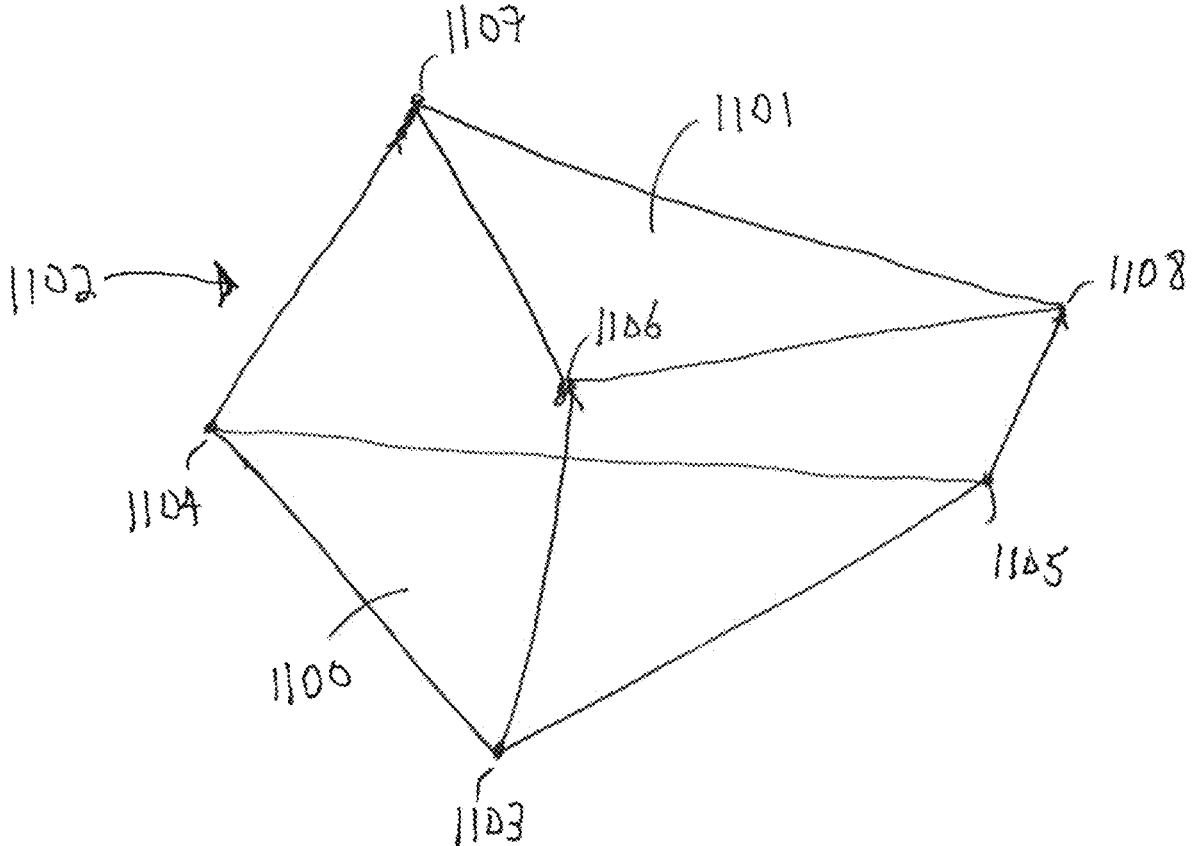
FIG. 11 shows a bounding volume for a node of a ray tracing acceleration data structure for a displacement micromapped triangle in an embodiment of the technology described herein.

FIG. 11 illustrates this, and shows an exemplary sub-triangle 1100 formed by the undisplaced vertex positions 1103, 1104 and 1105 for the sub-triangle in question, and the corresponding "displaced" sub-triangle 1101 formed by the displaced vertex positions 1106, 1107 and 1108 for the sub-triangle 1100, and the corresponding bounding volume 1102 that will be generated and used for the node representing that sub-triangle in the ray tracing acceleration data structure.

(As discussed above, the undisplaced vertices (vertex positions) 1103, 1104 and 1105 forming the "undisplaced" sub-triangle 1100 will be determined by appropriate interpolation from the vertices (the vertex positions) of the base displacement micromapped triangle, based on the position of the sub-triangle vertices in question. The displaced vertices (vertex positions) 1106, 1107 and 1108 for those sub-triangle vertices that accordingly form the displaced sub-triangle 1101 will correspondingly be determined from the undisplaced vertex positions 1103, 1104 and 1105, respectively, by applying an appropriate displacement to the undisplaced vertex positions based on appropriately interpolated displacement vectors for each undisplaced vertex position, and the displacement scale factor indicated by the displacement micromap for the sub-triangle vertex in question.)

In the present embodiments, rather than determining an appropriate ray tracing acceleration data structure for displacement micromapped triangle in advance, the ray tracing acceleration data structure is determined as and when it is determined that a ray (potentially) intersects the triangle in question. Moreover, only part of the ray tracing acceleration data structure for a displacement micromapped triangle is generated at any one time, with further parts of that structure being generated as and when required as traversal of the structure for a ray proceeds.

Figure 12:
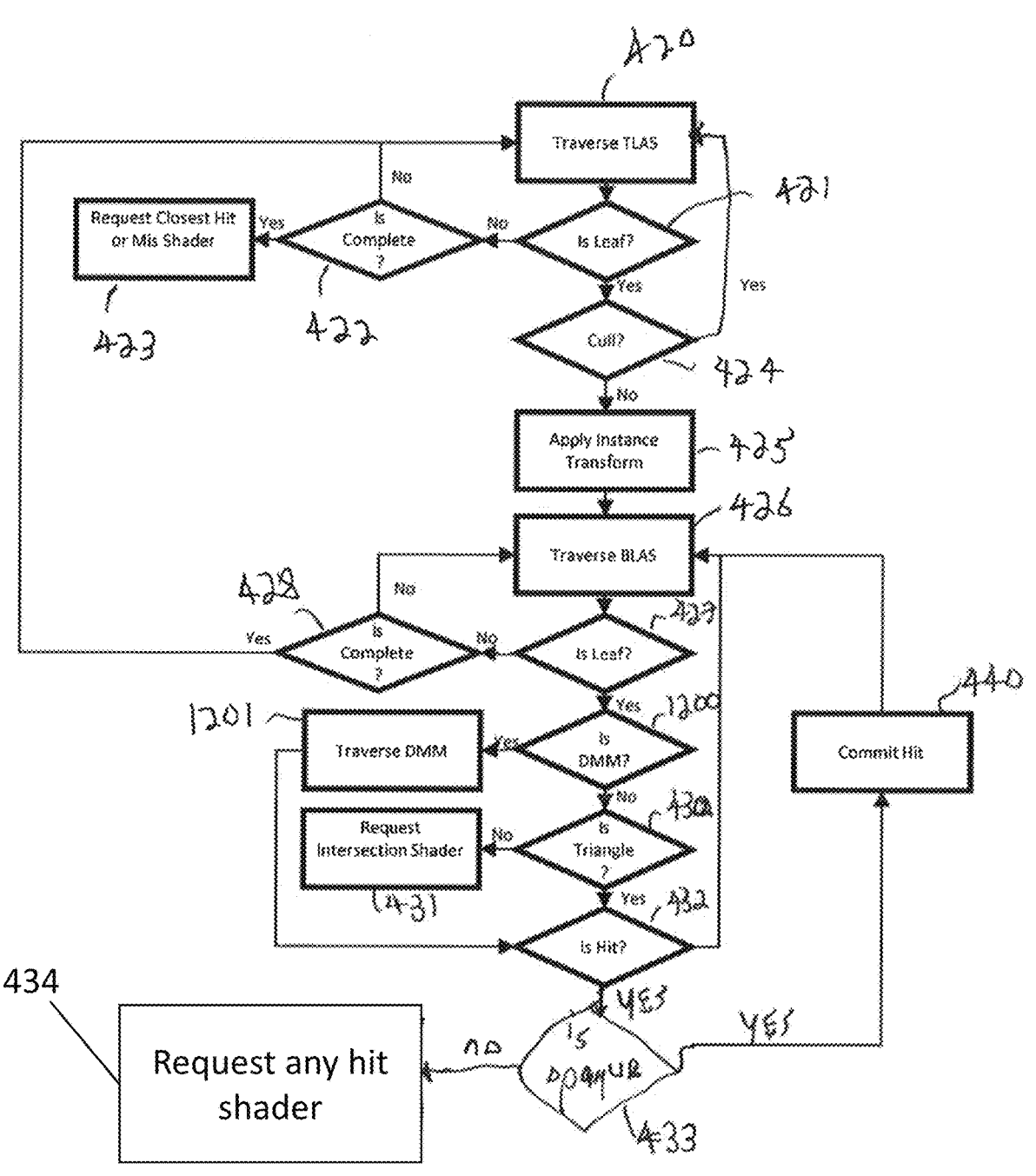
FIGS. 12 and 13 show embodiments of the ray tracing process in an embodiment of the technology described herein.
Figure 13:
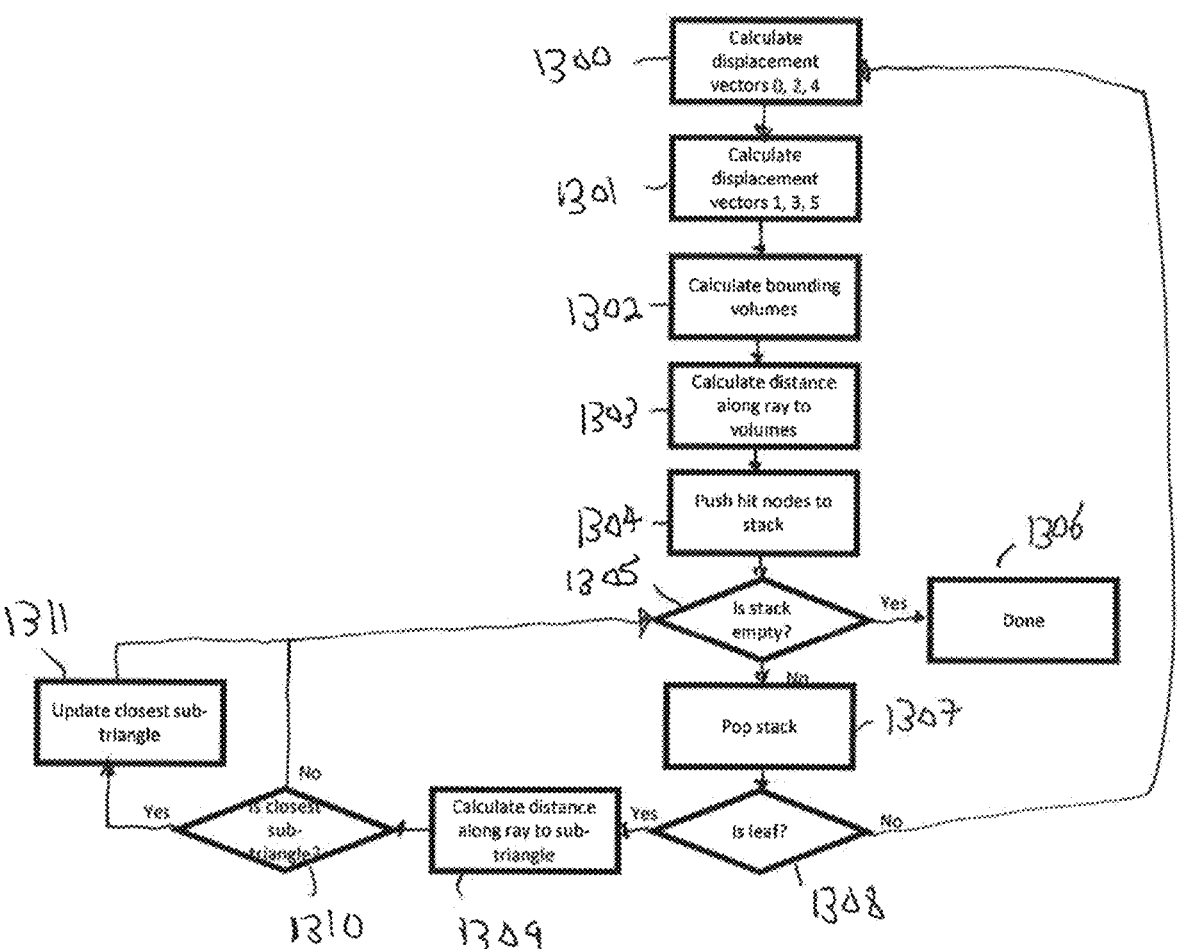

FIGS. 12 and 13 illustrate this. FIG. 12 shows the overall ray tracing process in embodiments of the technology described herein, and accordingly corresponds essentially to the process shown in FIG. 4B. (Correspondingly, and for this reason, any steps in FIG. 12 that correspond to the corresponding step of FIG. 4B will not be described in detail again.)

As shown in FIG. 12, the process again first traverses a TLAS for a ray to identify a BLAS, if any, to be traversed for the ray (steps 420-425).

When a BLAS is to be traversed for a ray, that BLAS is then traversed appropriately until a leaf node (if any) that the ray intersects is identified (steps 426 and 427).

However, in the present embodiments, when a leaf node that is intersected is identified, it is then determined whether the leaf node corresponds to a displacement micromapped triangle (step 1200). If so, the appropriate ray tracing acceleration data structure for the intersected displacement micromapped triangle is traversed (step 1201) to determine the sub-triangle of the displacement micromapped triangle that the ray intersects.

As shown in FIG. 12, once the traversal of the ray tracing acceleration data structure for a displacement micromapped triangle has been completed and identified a sub-triangle hit, then it is determined whether the sub-triangle is opaque (step 433), and the hit either committed or an any hit shader requested, accordingly (steps 440 and 434). Correspondingly, if no sub-triangle is hit, then the process continues to traverse the BLAS.

Equally, as shown in FIG. 12, in the case where an intersected leaf does not relate to a displacement micromapped triangle, then the leaf is processed in the manner discussed above with reference to FIG. 4B (steps 430, 431 and 432).

FIG. 13 shows the operation of traversing a ray tracing acceleration data structure for a displacement micromapped triangle in the present embodiments, corresponding to step 1201 in FIG. 12).

As shown in FIG. 13, and as discussed above, in the present embodiment, when traversing the ray tracing acceleration data structure for a displacement micromapped triangle, only part of the ray tracing acceleration data structure is generated at any one time, with further parts of that structure being generated as and when required as traversal of the structure for a ray proceeds.

Thus, as shown in FIG. 13, when it has been determined that a displacement micromapped triangle is (potentially) intersected by a ray, a first portion of the ray tracing acceleration data structure for the displacement micromapped triangle is generated. In particular, appropriate bounding volumes for a first level of sub-division are generated. Thus firstly the displacement vectors for the vertices of the triangle defined at the higher level of sub-division are determined (step 1300), and then the vectors for the additional vertices for the sub-triangles at the next level of sub-division down are determined (step 1301).

The bounding volume for each respective sub-triangle at the lower level of sub-division being considered is then generated using the displacement vectors and the vertex positions and planes joining the respective undisplaced and displaced sub-triangles (as discussed above) (step 1302).

Figure 14:
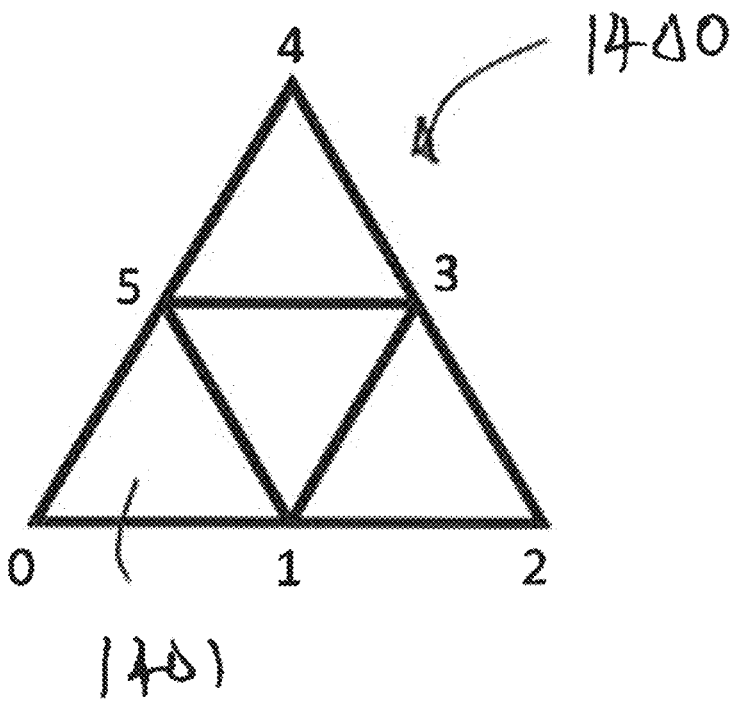
FIGS. 14 and 15 illustrate the generation of part of a ray tracing acceleration data structure for a displacement micromapped triangle in an embodiment of the technology described herein.
Figure 15:
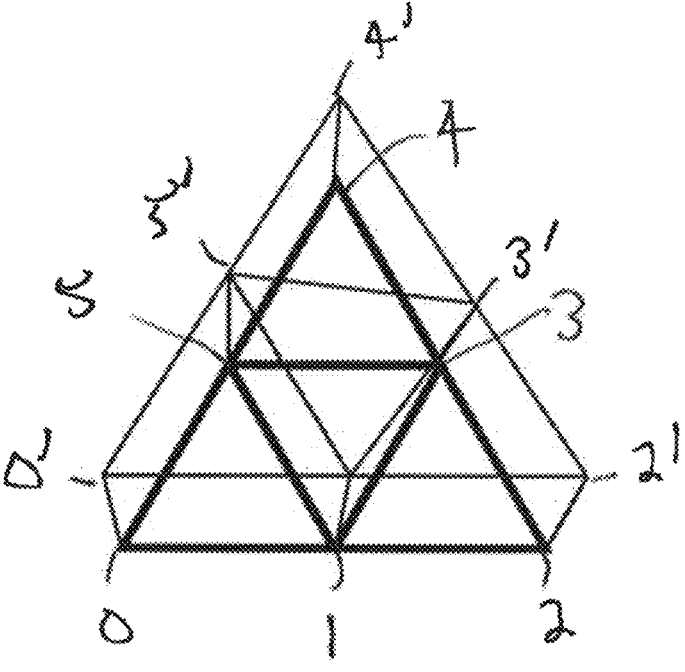

FIGS. 14 and 15 illustrate this, for an exemplary sub-triangle 1400 at a higher level of sub-division that divided into four sub-triangles 1401 at the next lower level of sub-division (FIG. 14). FIG. 15 shows the corresponding bounding volumes having triangular ends based on the undisplaced vertices 0, 1, 2, 3, 4, 5 and displaced vertices 0', 1', 2', 3', 4' and 5' of the sub-triangles.

Once the appropriate ray tracing acceleration data structure and bounding volumes have been generated, then the ray can traverse the generated bounding volume hierarchy to identify any bounding volumes that are intersected by the ray (steps 1303 and 1304). Any bounding volumes that are intersected by a ray are added to a list (stack) of intersected nodes (step 1304). It is then determined whether the list (stack) of hit nodes is empty (step 1305). If so, then the traversal of the displacement micromapped triangle for the ray has been completed (step 1306).

When there are intersected nodes still to be tested, then the next node is taken from the list (step 1306) and it is determined whether it is a leaf (end) node of the ray tracing acceleration data structure for the displacement micromapped triangle or not (step 1307).

Where the intersected node is not an end (leaf) node, then the process returns to generate the next part of a ray tracing acceleration data structure for the displacement micromapped triangle to allow the traversal for the ray to be continued. Thus, the appropriate child nodes, including their bounding volumes, for that intersected node are generated and the ray tested against those nodes (steps 1300-1304) in the manner discussed above. In this way, the ray tracing acceleration data structure for the displacement micromapped triangle is progressively generated as it is traversed by a ray.

On the other hand, where the node being tested is an end (leaf) node of the ray tracing acceleration data structure (and so represents one or more sub-triangles at the lowest level of sub-division), then it is determined whether any of the sub-triangles that the node relates to are the closest hit triangle so far (steps 1308 and 1309) (by performing an appropriate ray-triangle intersection test for the displaced sub-triangle(s) that the end (leaf) node represents).

If a sub-triangle that is hit is the closest sub-triangle so far, then the closest sub-triangle hit is updated (step 1310).

In either case, the traversal of the ray tracing acceleration data structure for the ray continues (step 1305).

This process is continued until the traversal of the ray tracing acceleration data structure for the displacement micromapped triangle has been completed.

Once the closest sub-triangle that the ray hits has been determined by traversing the ray tracing acceleration data structure for the displacement micromapped triangle, then that hit is processed in the manner discussed above, either to "commit" the hit, or to execute an any hit shader (steps 432, 433, 434 and 440 in FIG. 12).

This process will be followed each time a triangle that has an associated displacement micromap is determined as having been (potentially) intersected by a ray.

It can be seen from the above that the technology described herein, in its embodiments at least, provides a mechanism for accelerating a ray tracing process for displacement micromapped triangles. This is achieved, in the embodiments of the technology described herein at least, by using ray tracing acceleration data structures representative of displacement micromapped triangles, in which the nodes of the ray tracing acceleration data structures have bounding volumes formed by triangular ends and planes joining the respective sides of the triangular ends of the bounding volumes.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processing system that is operable to generate a render output by performing a ray tracing process in which rays are traced for a scene to be rendered;

the method comprising:

for a triangular primitive for a scene being rendered that has an associated displacement micromap that stores displacement information for respective vertices of a plurality of sub-triangles that the triangular primitive is to be divided into, providing a ray tracing acceleration data structure comprising nodes having associated bounding volumes for use when determining a sub-triangle of the triangular primitive that may be intersected by a ray, wherein the bounding volumes of the nodes of the ray tracing acceleration data structure comprise volumes having triangular ends and formed by the triangular ends and planes joining corresponding sides of the triangular ends of the volume, wherein one triangular end of the bounding volume for a node comprises the sub-triangle at the micromap sub-division level that the node represents without any displacement of its vertices, and the other end of the bounding volume is the sub-triangle formed by the displaced positions of the vertices of the sub-triangle; the method further comprising:

when a ray intersects the triangular primitive having the associated displacement micromap:

traversing the ray tracing acceleration data structure for the primitive for the ray; and performing further processing based on the traversing the ray tracing acceleration data structure for the primitive for the ray.

2. The method of claim 1, wherein the ray tracing acceleration data structure is arranged as a hierarchy of nodes representing a hierarchy of bounding volumes.

3. The method of claim 1, wherein each node of the ray-tracing acceleration data structure represents a particular set of one or more sub-triangles of the triangular primitive.

4. The method of claim 1, wherein the ray tracing acceleration data structure does not represent one or more of the lowest levels of the micromap sub-division.

5. The method of claim 1, wherein the triangular ends of the bounding volume for a node of the ray tracing acceleration data structure for the displacement micromapped triangle are based on the sub-triangle at the micromap subdivision level that the node represents.

6. The method of claim 1, comprising generating the ray tracing acceleration data structure that is provided for the displacement micromapped triangular primitive in response to determining that a ray for a scene being rendered potentially intersects the triangular primitive.

7. The method of claim 1, comprising:

in response to determining that a ray potentially intersects a triangle having an associated displacement micromap:

generating a first part of a ray tracing acceleration data structure for the displacement micromapped triangle;

traversing that first generated part of the ray tracing acceleration data structure for a ray; and generating further parts of the ray tracing acceleration data structure for the displacement micromapped triangular primitive based on the traversal of the parts of the ray tracing acceleration data structure that have been generated.

8. The method of claim 7, wherein the part of a ray tracing acceleration data structure that is generated at any one time comprises only some but not all of the sub-division levels of the displacement micromapped triangle.

9. A method of generating a ray-tracing acceleration data structure for use for a ray-tracing process, the method comprising:

generating for a triangular primitive for a scene to be rendered that has an associated displacement micromap that stores displacement information for respective vertices of a plurality of sub-triangles that the triangular primitive is to be divided into:

a ray tracing acceleration data structure comprising nodes having associated bounding volumes for use when determining a sub-triangle of the triangular primitive that may be intersected by a ray;

wherein the bounding volumes of the nodes of the ray tracing acceleration data structure comprise volumes having triangular ends and formed by the triangular ends and planes joining corresponding sides of the triangular ends of the volume, wherein one triangular end of the bounding volume for a node comprises the sub-triangle at the micromap sub-division level that the node represents without any displacement of its vertices, and the other end of the bounding volume is the sub-triangle formed by the displaced positions of the vertices of the sub-triangle.

10. A graphics processing system that is operable to generate a render output by performing a ray tracing process in which rays are traced for a scene to be rendered;

the graphics processing system comprising:

a ray-tracing acceleration data structure providing circuit configured to provide for a triangular primitive for a scene being rendered that has an associated displacement micromap that stores displacement information for respective vertices of a plurality of sub-triangles that the triangular primitive is to be divided into, a ray tracing acceleration data structure comprising nodes having associated bounding volumes for use when determining a sub-triangle of the triangular primitive that may be intersected by a ray, wherein the bounding volumes of the nodes of the ray tracing acceleration data structure comprise volumes having triangular ends and formed by the triangular ends and planes joining corresponding sides of the triangular ends of the volume, wherein one triangular end of the bounding volume for a node comprises the sub-triangle at the micromap sub-division level that the node represents without any displacement of its vertices, and the other end of the bounding volume is the sub-triangle formed by the displaced positions of the vertices of the sub-triangle;

and a ray tracing acceleration data structure traversal circuit configured to, when a ray intersects a triangular primitive having an associated displacement micromap:

traverse a ray tracing acceleration data structure for the primitive for a ray; and perform further processing based on the traversing the ray tracing acceleration data structure for the primitive for the ray.

11. The system of claim 10, wherein the ray tracing acceleration data structure is arranged as a hierarchy of nodes representing a hierarchy of bounding volumes.

12. The system of claim 10, wherein each node of the ray-tracing acceleration data structure represents a particular set of one or more sub-triangles of the triangular primitive.

13. The system of claim 10, wherein the ray tracing acceleration data structure does not represent one or more of the lowest levels of the micromap sub-division.

14. The system of claim 10, wherein the triangular ends of the bounding volume for a node of the ray tracing acceleration data structure for the displacement micromapped triangle are based on the sub-triangle at the micromap sub-division level that the node represents.

15. The system of claim 10, configured to:

generate the ray tracing acceleration data structure that is provided for the displacement micromapped triangular primitive in response to determining that a ray for a scene being rendered potentially intersects the triangular primitive.

16. The system of claim 10, configured to:

in response to determining that a ray potentially intersects a triangle having an associated displacement micromap:

generate a first part of a ray tracing acceleration data structure for the displacement micromapped triangle;

traverse that first generated part of the ray tracing acceleration data structure for a ray; and generate further parts of the ray tracing acceleration data structure for the displacement micromapped triangular primitive based on the traversal of the parts of the ray tracing acceleration data structure that have been generated.

17. The system of claim 16, wherein the part of a ray tracing acceleration data structure that is generated at any one time comprises only some but not all of the sub-division levels of the displacement micromapped triangle.

18. A graphics processor that is operable to generate a render output by performing a ray tracing process in which rays are traced for a scene to be rendered;

the graphics processor comprising:

a ray tracing acceleration data structure traversal circuit configured to, when a ray intersects a triangular primitive for a scene being rendered that has an associated displacement micromap that stores displacement information for respective vertices of a plurality of sub-triangles that the triangular primitive is to be divided into:

traverse a ray tracing acceleration data structure for the primitive for a ray, the ray tracing acceleration data structure comprising nodes having associated bounding volumes for use when determining a sub-triangle of the triangular primitive that may be intersected by a ray, wherein the bounding volumes of the nodes of the ray tracing acceleration data structure comprise volumes having triangular ends and formed by the triangular ends and planes joining corresponding sides of the triangular ends of the volume, wherein one triangular end of the bounding volume for a node comprises the sub-triangle at the micromap sub-division level that the node represents without any displacement of its vertices, and the other end of the bounding volume is the sub-triangle formed by the displaced positions of the vertices of the sub-triangle;

and a processing circuit or circuits configured to perform further processing based on the traversing the ray tracing acceleration data structure for the primitive for the ray.

* * * * *